(12) United States Patent
Roy et al.

(10) Patent No.: US 7,337,691 B2
(45) Date of Patent: Mar. 4, 2008

(54) PARALLEL KINEMATICS MECHANISM WITH A CONCENTRIC SPHERICAL JOINT

(76) Inventors: Shambhu Nath Roy, 101 E. Mallard Dr., #276, Boise, ID (US) 83706; Michael Merz, Tannenstr 41, Swisttal (DE) 53913

( * ) Notice: Subject to any disclaimer, the term of this patent is extended or adjusted under 35 U.S.C. 154(b) by 399 days.

(21) Appl. No.: 10/788,923

(22) Filed: Feb. 27, 2004

(65) Prior Publication Data

US 2004/0211284 A1    Oct. 28, 2004

Related U.S. Application Data

(60) Continuation-in-part of application No. 10/619,134, filed on Jul. 15, 2003, now abandoned, which is a continuation-in-part of application No. 10/278,701, filed on Oct. 23, 2002, now Pat. No. 6,648,583, which is a division of application No. 09/368,856, filed on Aug. 5, 1999, now Pat. No. 6,497,548.

(51) Int. Cl.
B25J 17/00 (2006.01)
B25J 17/02 (2006.01)
B25J 18/00 (2006.01)
B25J 18/04 (2006.01)

(52) U.S. Cl. ............................. 74/490.06; 74/490.05; 74/490.01; 901/28; 901/29

(58) Field of Classification Search ............ 74/490.01, 74/490.03, 490.05, 490.06; 414/735, 729, 414/680, 917; 901/28, 29, 15
See application file for complete search history.

(56) References Cited

U.S. PATENT DOCUMENTS 2,286,571 A * 6/1942 Pollard ...................... 118/705
4,776,749 A 10/1988 Wanzenberg et al.
4,790,718 A 12/1988 Vickers
4,976,582 A 12/1990 Clavel
5,179,525 A 1/1993 Griffis et al.
5,539,291 A * 7/1996 Reboulet ............... 318/568.11
6,116,844 A * 9/2000 Hayward ..................... 414/680
7,011,489 B2 * 3/2006 Brogardh et al. ............ 414/735
2004/0103739 A1 * 6/2004 Brogardh et al. ......... 74/490.01
2005/0172750 A1 * 8/2005 Kock et al. .............. 74/490.01

FOREIGN PATENT DOCUMENTS

| DE | 198 40 886 A1 | 3/2000 |
| DE | 19840886 A1 * | 3/2000 |
| DE | 101 53 854 C1 | 6/2003 |
| WO | WO 02/22320 A1 * | 3/2002 |
| WO | WO 02/058895 A1 | 8/2002 |
| WO | WO 03/066289 A1 * | 8/2003 |

* cited by examiner

Primary Examiner—Richard Ridley
Assistant Examiner—Terence Boes

(57) ABSTRACT

A parallel kinematics mechanism is provided for uses such as robotics or machining. The mechanism has various limbs designed as elbow-linkages, at least some of which are actuatable, for moving an end component with multiple degrees of freedom. The mechanism advantageously facilitates an improved workspace-to-footprint ratio and a closed-form solution for the forward kinematics. The mechanism comprises a joint assembly having a plurality of revolute joints for connecting to at least three limbs. In various embodiments of the invention, the end component has three, four, five and six degrees of freedom.

24 Claims, 15 Drawing Sheets

PARALLEL KINEMATICS MECHANISM WITH A CONCENTRIC SPHERICAL JOINT

This patent application is a continuation-in-part of U.S. patent application Ser. No. 10/619,134, filed Jul. 15, 2003 now abandoned, which is a continuation-in-part of U.S. patent application Ser. No. 10/278,701, filed Oct. 23, 2002, now U.S. Pat. No. 6,648,583, granted Nov. 18, 2002, which is a divisional of U.S. patent application Ser. No. 09/368, 856, filed Aug. 5, 1999, now U.S. Pat. No. 6,497,548, granted Dec. 24, 2002.

BACKGROUND

The present invention generally relates to an apparatus with multiple limbs for positioning and orienting an end component in space and to joints for linking limbs of such an apparatus.

A need exists for simple and effective parallel kinematics mechanisms. Kinematics mechanisms are used in mechanical engineering applications for machining, robotics, positioning devices, coordinate measuring, fixtures and so on. In general, mechanisms can be classified as either serial or parallel. Serial kinematics mechanisms are widely used and presently dominate the market.

A serial kinematics mechanism has a series of cantilever beams that are movably connected together in an end-to-end fashion by prismatic, revolute or spherical joints, forming an open loop. The closer that a member is to a base of the mechanism within the serial structure, the higher the load on that member. Additionally, the farther that a member is from the base, the higher its deflection with respect to the base member. When a serial kinematics mechanism is subjected to loading, the position of the farthest member, i.e., the end-effector, is subject to the cumulative deflections of all serial members. This results in large positioning errors at the end-effector. Being constructed of cantilevers, a serial mechanism has a poor stiffness-to-mass ratio, making such structures bulky in design.

Serial kinematics mechanisms allow fast and easy computation of the position of the end-effector given the position or state of all actuators. In general, this computation is known as the forward kinematics of a mechanism. However, determining the position or state of all actuators given the position of the end-effector, also known as the inverse kinematics, is generally difficult.

Relative to serial kinematics mechanisms, parallel kinematics mechanisms typically have an improved stiffness-to-mass ratio, better accuracy, superior dynamic properties and can move at higher speeds and accelerations. A parallel kinematics mechanism has a plurality of links which form one or more closed loops, the links thereby sharing the load on the end-effector. Links of such a mechanism typically experience only compression or pulling forces allowing the use of cheaper material and simpler link designs. Moreover, positioning errors of actuators are typically divided, thereby resulting in a high accuracy of the end-effector. A well-known parallel kinematics mechanism is the Stewart-Gough Platform which was introduced in 1965 and has since been the subject of extensive study and analysis. A Stewart-Gough Platform mechanism generally includes a movable platform which is connected to a base by six controllable links. For example, U.S. Pat. No. 5,179,525 discloses a general overview on mechanisms that are based on or derived from the Stewart-Gough Platform.

While parallel kinematics mechanisms can provide improved accuracy, stiffness, and high load carrying capacity, they also suffer from significant control drawbacks. Most known parallel kinematics mechanisms have very difficult forward kinematics. The solutions of the forward kinematics are in the form of high-order polynomial equations, which do not allow closed-form solutions to compute the end-effector position. Computationally intensive methods such as numerical approximations must be applied in order to calculate multiple solutions and select the right one. For example, it has been shown that the general form of the Stewart-Gough Platform has forty feasible solutions. For some special forms of the Stewart-Gough Platform, closed-form solutions of the forward kinematics exist. In these special forms, pairs and triples of spherical joints that connect the links to base and platform are concentric. However, the difficulty of manufacturing such joints is well recognized in the art.

Stewart-Gough-type mechanisms typically allow for the positioning and orientation of the movable platform with six degrees of freedom. In general, the position and orientation of the platform are coupled which complicates the controls. Moreover, due to singularities in the workspace and the restricted working range of joints and actuators, the translational and in particular the rotational motion range of the platform is significantly limited. However, many applications, such as machining or assembly operations, require actuation about an axis with multiple or infinite rotations, which is usually accomplished by additional motors or spindles mounted on the end-effector. This means that one of the actuations of these mechanisms is redundant. In addition, many applications, such as flexible assembly operations or 5-axis machining, require a large orientation capability of the end-effector.

Therefore, alternative parallel kinematics mechanisms have been proposed. For example, U.S. Pat. No. 4,776,749 discloses a robotic device with only five actuated positioning members to position and orient a work tool in space. The device uses two concentric ball-and-socket joints, the first of which connects three and the second of which connects the remaining two actuated positioning members at a respective first and second common point. The device thereby forms a bi-tetrahedral arrangement which decouples the positioning and orienting of the work-tool. While this arrangement facilitates structural rigidity and a closed-form solution of the forward kinematics, the concentric joint design significantly restricts the rotational freedom of each positioning member. Moreover, such joints limit the orientation range of the work tool and are difficult to manufacture in a precise and cost-efficient manner.

In order to accomplish a rigid, bi-tetrahedral structure of the mechanism and simple forward kinematics, alternative joints to connect three or more limbs with spherical motion about a common point have been proposed. For example, U.S. Pat. No. 5,657,584 discloses a joint which uses a large number of elements and pins to produce spherical motion of the attached limbs, resulting in a complex and costly structure. Such a joint is not capable of carrying high loads and offers only limited spherical motion to its limbs.

Another parallel kinematics mechanism without a redundant sixth actuator is disclosed in DE 198 40 886 A1. Five actuated elbow-linkages are connected by separate universal joints to a movable platform which can be positioned and oriented in space. The movable platform serves as the central link which connects all elbow-linkages to form closed loops. The arrangement simplifies the joint design, but neither allows for a closed-form solution of the forward kinematics nor for the decoupling of the position and orientation of the movable platform. The arrangement no longer forms a rigid, bi-tetrahedral structure. Additionally, in comparison to the Stewart-Gough Platform the mechanism is reported to only marginally improve the orientation capability of the movable platform.

Yet another parallel kinematics mechanism with five actuated links is presented in DE 101 53 854 C1. Similar to the aforementioned device, a simplified joint design consisting of five pairs of single-axis joints with a common line of rotation is provided to improve manufacturability of the mechanism. However, the arrangement neither allows for a closed-form solution of the forward kinematics problem nor for the decoupling of the end-effector position and orientation. Moreover, structural rigidity is lost by deviating from a purely bi-tetrahedral structure.

It is well recognized in the art that parallel kinematics mechanisms and in particular devices based on the Stewart-Gough Platform or any of the aforementioned disclosures suffer from a small workspace-to-footprint ratio. The end-effector typically has a limited reach which is further reduced when high orientation capability is required at any point in the workspace. The poor workspace-to-footprint ratio is widely considered a critical factor preventing parallel kinematics mechanisms from entering or penetrating the market and successfully competing with serial kinematics mechanisms.

The described disadvantage is not only inherent to all above-mentioned disclosures but also to various parallel kinematics mechanisms which provide less than five or six degrees of freedom at the end-effector. For example, U.S. Pat. No. 4,790,718 discloses a manipulator to position a flange with known orientation in space. By design, the manipulator is mounted on a truss to operate in a top-down fashion, resulting in a large footprint similar in size to the projected workspace volume. Another device for the movement and positioning of an element in space with three or four degrees of freedom is presented by U.S. Pat. No. 4,976,582. Like the previously described manipulator, the device lends itself to being operated under a truss to which it is mounted, resulting in a similar workspace-to-footprint ratio.

To improve the workspace-to-footprint ratio of parallel kinematics mechanisms, alternative designs have been proposed. For example, WO 02/22320 A1 discloses a manipulator to move an object in space with at least three arms. Two arms are mounted on a central column and rotatably actuated to move in horizontal planes while the third arm is actuated to operate in a vertical plane. Links connect the arms to the end-effector which can move around this column in a cylindrical workspace with three translational degrees of freedom. In one of the disclosed manipulators, the actuator of the third arm is mounted on and rotated by one of the other arms, causing additional inertia and asymmetric torque loads for the two arms. Whenever the end-effector is either at a great distance from or in close proximity to the central column, such an arrangement places the third arm in an unfavorable, asymmetric position relative to the other two arms and causes asymmetric stiffness and accuracy characteristics.

WO 02/058895 A1 discloses a similar manipulator which, in addition, includes a linkage connecting the movements of the three arms such that the third arm always remains in the middle between the other two arms. This results in an improved workspace-to-footprint ratio which is comparable to that of serial kinematics mechanisms of the type known as SCARA robots (Selective Compliance Assembly Robot Arm). However, the mechanisms of both disclosures provide no orientation capability and only three translational degrees of freedom at the end-effector. If orientation capability is desired, wrists or other devices must be mounted in series on the end-effector, making the design complex and the mechanism heavy and slow. Moreover, the use of ball-and-socket joints in the links between the end-effector and the arms is preferred in the aforementioned disclosures but is not desirable in many applications. Furthermore, the mechanism requires a large number of degrees of freedom of the passive joints per degree of freedom provided at the end-effector, causing additional costs, backlash, and inaccuracies.

Another manipulator similar to the one shown in WO 02/058895 A1 is disclosed in U.S. Pat. No. 5,539,291. The manipulator employs three drive mechanisms interposed between a base and a moving element to displace and orient the moving element in a cylindrical workspace with three degrees of freedom. Mover elements of two of the drive mechanisms each operate in a transverse plane and determine the radial distance and orientation of the moving element via a connecting rod and an attitude transmission member which keeps the moving element at a constant attitude towards the transverse plane. The third drive mechanism operates in a plane perpendicular to the transverse plane and influences the axial position of the moving element in the cylindrical workspace. Similar to the aforementioned disclosures, the manipulator only provides three translational degrees of freedom and therefore lacks orientation capability of the moving element. Moreover, the preferred implementation of the attitude transmission member as two wheels and cables may be undesirable in terms of manufacturing cost, assembly, accuracy, backlash and manipulator rigidity.

A major concern in many robotics applications is cable management. To connect various utilities such as power, sensors, encoders at joints, or pressure, power or utility lines must be routed along the moving structure of the mechanism, exposing such lines to significant stress and wear. To ensure operational reliability, custom-made power or utility lines are required, causing considerable extra cost.

Another concern particularly with existing serial kinematics mechanisms, such as SCARA or articulated robots, is the lack of scalability and modularity. To vary the output parameters, such as workspace size or shape, stiffness or accuracy characteristics, the entire serial structure including the actuators typically needs to be redesigned and replaced. Thus, offering a wide range of products does not allow for economies of scale.

A need therefore exists to provide a parallel kinematics mechanism that has simple and practical forward kinematics by allowing the solution for the end-effector position in closed-form. A need also exists for a parallel kinematics mechanism with joint structures that allow three or more limbs to be interconnected and facilitate closed-form solutions of the forward kinematics and decoupling of the end-effector position and orientation. Such a joint structure should be compact and cost-efficient in design, enhance the spherical motion range of the interconnected limbs, and should not restrict the workspace and the orientation range of the end-effector of the mechanism.

Furthermore, a need exists for a parallel kinematics mechanism that is accurate and exhibits a large translational and rotational motion range of the end-effector in combination with a high workspace-to-footprint ratio. Such a mechanism should have a rigid, bi-tetrahedral, robust, modular, and scalable design with no redundant actuators and joints and an improved stiffness-to-mass ratio. Moreover, a need exists to provide a fast mechanism with high acceleration capabilities and improved dynamic properties. Ideally, stiffness, accuracy, and acceleration properties of the end-effector should remain similar within the motion range of the end-effector. Furthermore, the mechanism should allow for simple cable management and improved operational reliability with reduced costs.

SUMMARY OF THE INVENTION

The present invention provides a parallel kinematics mechanism which overcomes difficulties incurred in prior art devices by using improved joint structures and a new limb arrangement.

An object of the invention is to provide an improved mechanism for positioning and orienting a member in space. A more specific object of the invention is to provide such a mechanism which facilitates simplified forward kinematics calculation with a closed-form solution. Advantageously, a kinematics mechanism having a design according to the present invention is such that the forward kinematics math is greatly simplified. The design of the proposed mechanism reduces calculations to the simple problem of finding the point of intersection of three spheres, which makes the forward kinematics trivial and has a closed-form solution for the position of the end-effector or end component.

According to an embodiment of the invention, the solution simplification has been achieved by a concentric spherical joint or joint assembly that allows three or more limbs to be connected together with their longitudinal axes always intersecting at a common point, regardless of the orientations. In an alternative embodiment, the joint assembly has a symmetric structure without intersecting limb axes simplifying the design as well as allowing a closed-form solution. The joint provides advantages over the prior art, exhibiting an improved range of spherical motion among its joined limbs, few and cost-efficient parts, low wear and friction, improved rigidity, and improved accuracy. It can also sustain tensile loads, unlike some ball-and-socket joints. The proposed joint assembly according to an embodiment of the invention advantageously has a simple and robust design, requiring only a minimum number of revolute joints per degree of freedom for a five-axis mechanism. In an embodiment, the symmetric design of a mechanism built in accordance with the invention allows for such a minimum number of revolute joints.

Another object of the invention is to provide a mechanism with an improved workspace-to-footprint ratio. In an embodiment of the invention, five actuated elbow-linkages are arranged to rotate about a common central axis with a minimal footprint, allowing for the positioning and orienting of an end component in a large cylindrical workspace with five or six degrees of freedom. The first three elbow-linkages are interconnected by a first joint assembly while the fourth and fifth elbow-linkages are joined by a second joint assembly, both the joint assemblies being further connected to the end component. The proposed arrangement significantly enhances the poor workspace-to-footprint ratio of prior art devices in the field of parallel kinematics mechanisms and compares to that of serial devices of the SCARA-type. Another advantage of the arrangement is the large workspace volume attainable by the end component combined with a large and symmetric orientation capability throughout this workspace. In another embodiment, two of the actuated elbow-linkages are arranged to rotate about separate axes which are parallel and close to each other, also resulting in an increased workspace-to-footprint ratio, higher stiffness and reduced manufacturing costs compared to prior art devices.

Yet another object of the invention is to provide a mechanism which is capable of fast end-effector movements and accelerations. According to an embodiment, the actuated parallel limbs of the mechanism exhibit an elbow-linkage design with an actuator arm and a forearm capable of translating small rotational actuations of the actuator arm into large end-effector displacements. The speed and dynamic properties of the mechanism are further enhanced by a light and simple design and the existence of a closed-form solution of the forward kinematics.

It is a further object of the invention to provide a mechanism with improved structural rigidity and accuracy. In an embodiment the invention utilizes two joint assemblies to connect five actuated elbow-linkages such that the structure formed by the forearms of the elbow-linkages resembles a bi-tetrahedral configuration, giving it truss-like behavior. Loads on the end component are generally distributed among all actuators which, in return, compensate for positioning errors of the end component through their parallel arrangement. Thereby, the mechanism provides a high stiffness-to-mass ratio and high accuracy. Since links supporting the end component are mostly subjected to compression or pulling forces, mechanisms with a design according to the invention can be built in a light and cost-efficient manner, especially in comparison to serial kinematics devices. The proposed bi-tetrahedral arrangement also decouples the position and orientation of the end component, simplifying the controls of the mechanism.

Another advantage of the invention is that, in an embodiment, it provides a mechanism which has a modular and non-redundant design that only uses five actuator limbs, four of which are identical, two kinds of joint assemblies, a base, an actuator, and a work tool. The low number of parts and the usage of mostly revolute joints or simple ball-and-socket joints results in a precise and cost-efficient positioning mechanism that finds wide use in many areas.

In a further embodiment, a parallel kinematics mechanism according to the present invention has five actuated elbow-linkages with actuator arms and forearms, the elbow-linkages being arranged to rotate about a common central axis. The mechanism further includes a linkage that influences the position of a first elbow-linkage depending on the state of one or more of the other elbow-linkages. Advantageously, the actuator arms of a second and third elbow-linkage operate in the same plane perpendicular to the central axis while the first elbow-linkage operates in a plane parallel to the central axis. The first elbow-linkage is rotated by the actuator arms of the second and third elbow-linkage and constrained to following their movements in order to achieve symmetric workspace conditions and a favorable structural stiffness of the mechanism. Preferably, the first elbow-linkage remains midway between the second and third elbow-linkage.

A further object of the invention is to provide a mechanism to position an end component in space with at least three translational degrees of freedom and fixed orientation. The mechanism includes only three actuated elbow-linkages, a first of which comprises of an actuated first limb member and a second limb member, a second and third of which comprise of an actuator arm and two forearms. A first joint assembly links the second limb member of the first elbow-linkage with one forearm of the second and third elbow linkage, while a second joint assembly interconnects the remaining forearm of the second and third elbow-linkage. The two joint assemblies together support an end component and a work tool in space. Preferably, the actuator arms of the second and third elbow-linkages operate in the same plane, whereas the first elbow-linkage operates in a direction perpendicular to that plane.

Work tools, such as cutting tools or robot grippers, can be mounted on the end component of mechanisms having a design according to the invention. In an embodiment, the work tool is powered by a motor or an actuator that is fixed on the base and transmits its rotation or motion on the work tool through a telescopic spline-shaft assembly. In another embodiment, the transmission is achieved via an elbow-linkage. Both designs allow moments acting about the longitudinal axis of the work tool to be directly transferred to the base, relieving the overall structure of the positioning and orienting mechanism. In another embodiment, the work tool is powered by a motor or an actuator that is fixed on the end component.

In yet another embodiment, a mechanism having a design according to the invention allows for extremely simple cable management by integrating all the actuators into or close to the fixed base. Therefore, most of the cables and other utility lines do not need to move or flex during operation and always stay in a fixed position relative to the base. Moreover, the base-integrated actuation combined with a light and inexpensive forearm structure significantly enhances the scalability of mechanisms provided by this invention. Varying the output parameters only requires substitution of the inexpensive forearm structure while costly actuators and base structures can be reused. This allows a standard design to be used for many applications with minimum modifications at a customer site.

Mechanisms according to an embodiment of the invention may be useful in machining and robotics. In particular, the mechanism can be used for free-form milling, assembly operations, pick-and-place tasks, coordinate measuring, or any other kind of operation that requires a member to be positioned and oriented in space.

Additional features and advantages of the present invention are described in, and will be apparent from, the detailed description of the preferred embodiments and from the drawings.

BRIEF DESCRIPTION OF THE DRAWINGS

The following is a description, by way of example only, of different embodiments of the mechanism, its variations, derivations and reductions.

DETAILED DESCRIPTION OF THE PRESENTLY PREFERRED EMBODIMENTS

Figure 1:
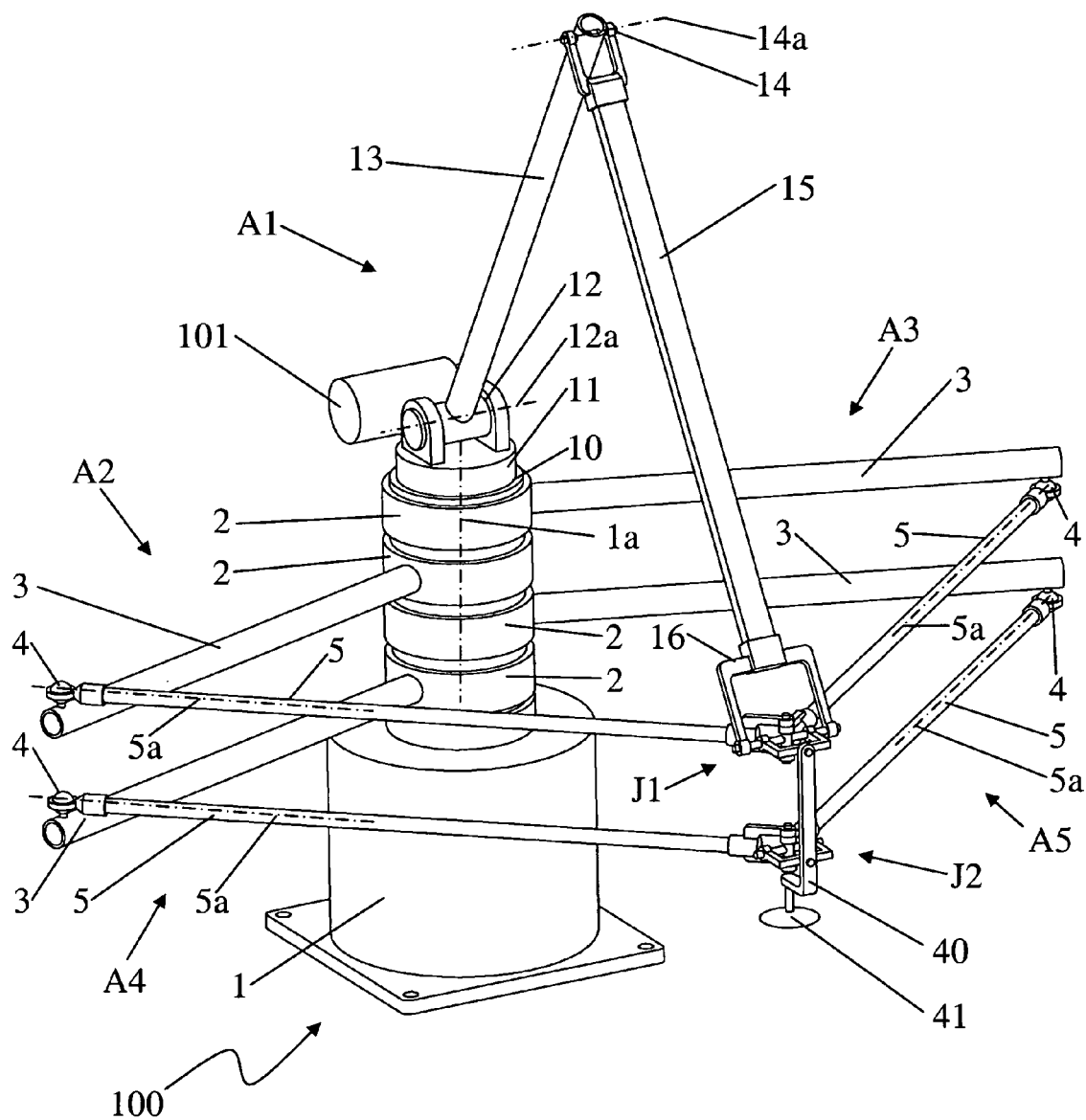
FIG. 1 is a perspective view of a bi-tetrahedral parallel kinematics mechanism constructed in accordance with the invention, the mechanism having five actuator limbs with an elbow-linkage design arranged to rotate about a central axis to position and orient an end component in space with five degrees of freedom.

Now referring to the drawings, wherein like numerals designate like components, FIG. 1 shows a five-axis parallel kinematics mechanism 100 constructed in accordance with teachings of the present invention. Mechanism 100 includes a fixed base 1 and is operable to position and orient an end component 40 in space relative to the base 1 with five degrees of freedom. The position and orientation of the end component 40 are determined by five actuator limbs A1, A2, A3, A4, and A5, as will be described.

As illustrated in FIG. 1, mechanism 100 includes a first tetrahedral structure formed by first, second, and third actuator limbs A1, A2, A3. Actuator limb A1 is an actuated elbow-linkage device comprising of a platform 11, a first limb member 13, and a second limb member 15. The platform 11 is movably mounted to the base 1 by a revolute joint 10, allowing free rotation of platform 11 relative to the base 1 about a central axis 1a. Moreover, an actuated revolute joint 12 connects the platform 11 to the first limb member 13, allowing the first limb member 13 to be rotated about a primary axis 12a upon actuation. Preferably, primary axis 12a is perpendicular to central axis 1a. As illustrated in the embodiment, the actuated revolute joint 12 is powered by an actuator 101 mounted on the platform 11. It should be understood that the actuated revolute joint 12 could alternatively be driven by an actuator fixed to the base 1 and a transmission gear. The second limb member 15 is movably connected to the first limb member 13 by a revolute joint 14 allowing the second limb member 15 to rotate relative to the first limb member 13 about a secondary axis 14a. Preferably, the secondary axis 14a remains parallel to the primary axis 12a for all poses of the mechanism 100.

Furthermore, as illustrated in FIG. 1, each of the actuator limbs A2 and A3 is an elbow-linkage device having a respective actuator arm 3 and forearm 5. The actuator arm 3 is connected to the base 1 by an actuated revolute joint 2 allowing the actuator arm 3 to be pivoted upon actuation about an actuator axis which, as illustrated in the embodiment, coincides with the central axis 1a. Each of the actuator limbs A2 and A3 further comprises of a ball-and-socket joint 4 connecting the actuator arm 3 to the forearm 5. The ball-and-socket joint allows the forearm 5 three rotational degrees of freedom relative to the actuator arm 3, including one rotational degree of freedom about a forearm axis 5a. Ideally, as shown in the embodiment, the pivot points or connection points of the ball-and-socket joints 4 of both actuator limbs A2 and A3 move in the same plane which is perpendicular to the central axis 1a.

Figure 4:
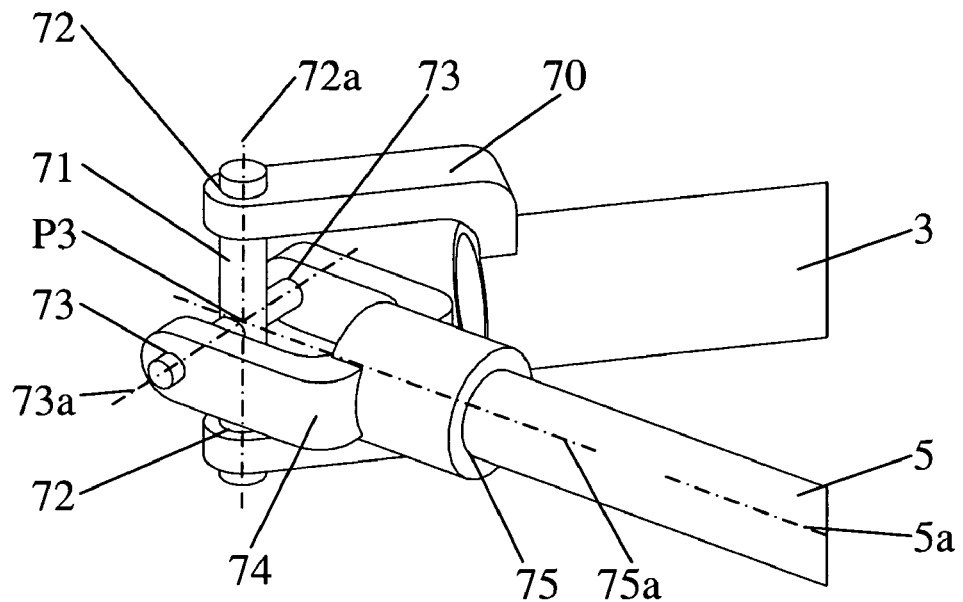
FIG. 4 is a perspective and detailed view of an alternative joint arrangement with three single-axis revolute joints in series that can replace the ball-and-socket joints in the elbow-linkages of the mechanism shown in the embodiment of FIG. 1.

Included in the concept of the invention is that the ball-and-socket joint 4 in the mechanism 100, and other mechanisms described herein, can be replaced by any joint arrangement allowing three rotational degrees of freedom. In particular, as shown in FIG. 4, a triple-axis joint assembly consisting of three revolute joints in series can be used to connect the actuator arm 3 to the forearm 5. Specifically in this embodiment, a first yoke 70 is rigidly attached to the actuator arm 3 and movably connected to a cross 71 by a first revolute joint 72 with an axis of rotation 72a. The cross 71 is further movably mounted to a second yoke 74 by a second revolute joint 73 with an axis of rotation 73a. The two yokes 70, 74 and the cross 71 together compare to a universal joint. A third revolute joint 75 movably connects the second yoke 74 to the forearm 5 allowing rotation about an axis 75a which preferably coincides with the forearm axis 5a. Ideally, all three axes of rotation 72a, 73a, and 75a intersect at a connection point P3 to facilitate a closed-form solution of the forward kinematics of the mechanism 100. Moreover, the connection points P3 of the triple-axis joint assemblies of both actuator limbs A2 and A3 preferably move in the same plane perpendicular to the central axis 1a. It will be recognized by those skilled in the art that the order of the three revolute joints 72, 73, and 75 can be changed without affecting the functioning of the mechanism.

Referring back to FIG. 1, the actuator limbs A1, A2, and A3 are linked together by a first joint assembly J1. More specifically, as illustrated in greater detail by FIG. 2, the second limb member 15 of actuator limb A1 has a rigidly attached yoke 16 which is movably connected to a joint body 20 by a revolute joint 17 allowing the yoke 16 to rotate about a first joint axis 20a. Ideally, the first joint axis 20a remains parallel to the primary axis 12a and the secondary axis 14a of the mechanism 100. The revolute joint 17, like all other revolute joints of mechanism 100 and other mechanisms disclosed herein, might include two individual bearings as shown in the embodiment. The forearms 5 of actuator limbs A2 and A3 are rigidly attached to respective yokes 6 which are rotatably connected to the joint body 20 by respective revolute joints 7. The revolute joints 7 allow each of the yokes 6 to independently rotate about a respective second and third joint axis, which may coincide with a first joint body axis 20b as shown in the embodiment. Ideally, the first joint body axis 20b is perpendicular to the first joint axis 20a. The joint body 20 generally has the shape of a cross as used in universal joints, but allows three or four, rather than just two, yokes to be connected to each other. The first joint axis 20a, the first joint body axis 20b, and the forearm axes 5a of the actuator limbs A2 and A3 may intersect or pass through a first common point P1, as shown in the embodiment. Preferably, the first joint body axis 20b is perpendicular to the forearm axes 5a of both actuator limbs A2 and A3.

As shown in FIG. 1, the first joint assembly J1 interconnects the three actuator limbs A1, A2, A3 with a geometry that ultimately facilitates a closed-form solution of the forward kinematics of mechanism 100. In addition, it constrains the angular position of the first actuator limb A1, which can generally rotate about the central axis 1a due to the revolute joint 10. Given the state of the actuated revolute joints 2 of the actuator limbs A2 and A3, the angular position of the actuator arms 3 and the location of the ball-and-socket joints 4 relative to the base 1 can be derived. With the ball-and-socket joints 4 being at known positions in space, the location of the first joint assembly J1 or, more specifically, the first common point P1 is restricted to lying on a circle. The circle corresponds to the intersection of two spheres, having a radius equal to the length of the forearms 5 and centered at the respective ball-and-socket joints 4. The actuator limb A1 adds a further restriction, which fully constrains the location of the first joint assembly J1 relative to base 1.

As a result of the preferred perpendicular arrangement of primary axis 12a and central axis 1a, a plane of symmetry can be defined for mechanism 100 and other mechanisms disclosed herein. The plane of symmetry is perpendicular to the primary axis 12a and contains or passes through the central axis 1a. Ideally, this plane also contains the first common point P1. Moreover, due to the preferred parallel arrangement of primary axis 12a, secondary axis 14a and first joint axis 20a, the first limb member 13 and the second limb member 15 are bound to move in this plane of symmetry and thus define the angular position of the platform 11 and the actuator limb A1. Given the state of the actuated revolute joint 12 and the orientation of the platform 11, the angular position of the first limb member 13 and the location of the revolute joint 14 are determined. This allows for the calculation of the first common point P1 by geometrically finding the point of intersection of the circle created by the intersection of two spheres as described above and an arc traced by the yoke 16 when allowed to rotate about the secondary axis 14a. Given the preferred symmetric design of the mechanism 100 as illustrated by the embodiment of FIG. 1, the actuator limb A1 will always be oriented midway between the two actuator arms 3 of the actuator limbs A2, A3.

Figure 2:
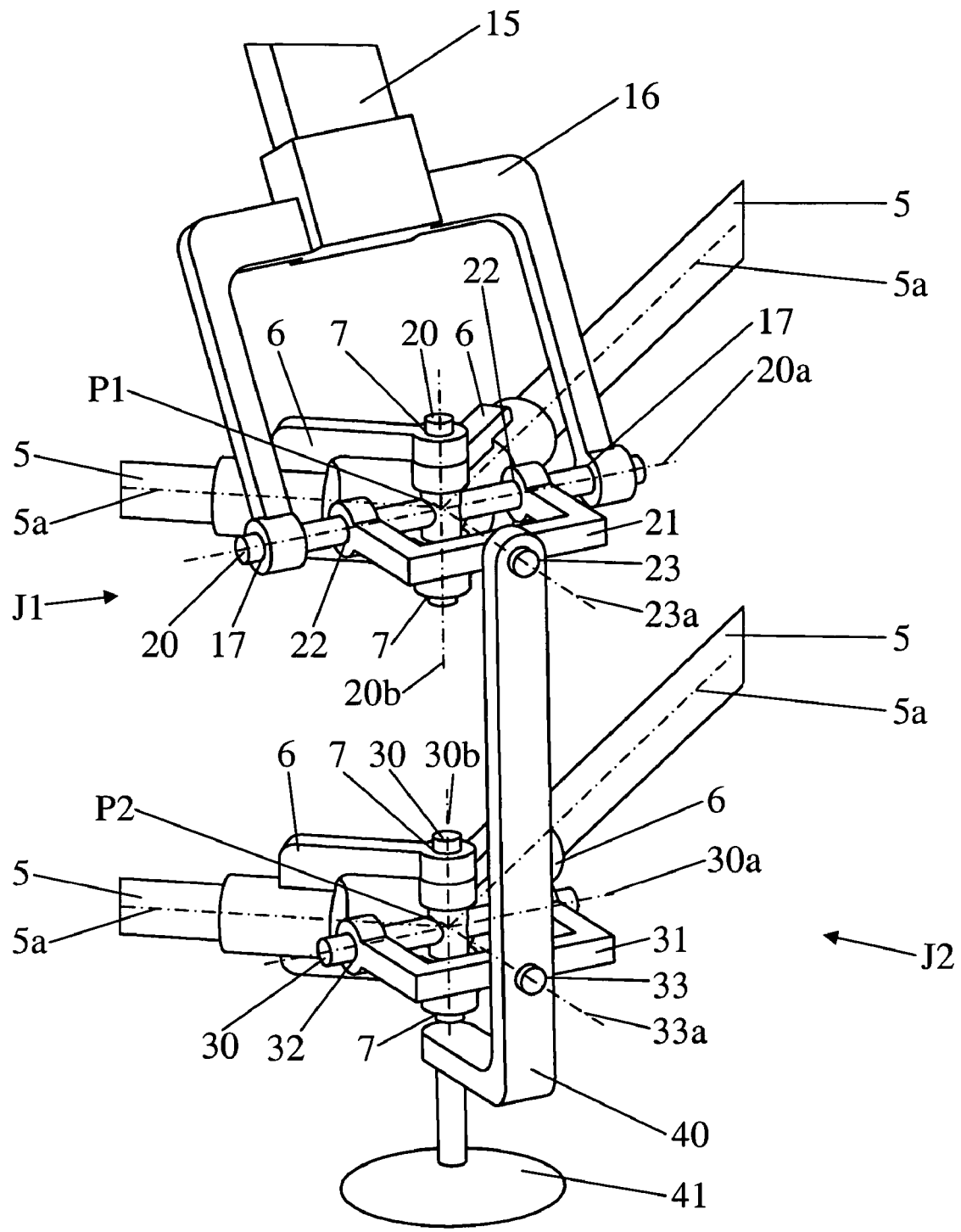
FIG. 2 is a perspective and detailed view of the end component and a first and second joint assembly, which link the five actuator limbs of the mechanism as shown in the embodiment of FIG. 1.

As will be recognized by those skilled in the art, there are generally two solutions for the location of the first common point P1, the first being on the inside of the three actuator limbs A1, A2, and A3, the second being on the outside. However, with the previous pose of the mechanism 100 known or based on the assembled configuration, the right solution can be selected. As shown in the embodiments of FIGS. 1 and 2, the actuator limbs A1, A2, and A3 not only constrain the position of the joint body 20 of the first joint assembly J1 but also its orientation. Since the first joint axis 20a is preferred to be parallel to the primary axis 12a and thus perpendicular to said plane of symmetry, the first joint body axis 20b is bound to be coplanar with said plane of symmetry and perpendicular to both forearm axes 5a of the actuator limbs A2 and A3.

Referring back to FIG. 2, the first joint assembly J1 is linked to the end component 40. More specifically, a yoke 21 is mounted on the joint body 20 by a first revolute joint 22 allowing rotation about a first revolute axis which, as illustrated in the embodiment, preferably coincides with the first joint axis 20a. The first revolute joint 22, like all other revolute joints of mechanism 100 and other mechanisms disclosed herein, might include two individual bearings as shown in the embodiment. The yoke 21 is further connected to the end component 40 by a second revolute joint 23 in series with the first revolute joint 22, allowing rotation about a second revolute axis 23a. Ideally, the second revolute axis 23a is generally perpendicular to the first revolute axis and the first joint axis 20a and also passes through the first common point P1. It should be understood that the first and second revolute axis can have any position and orientation relative to the joint body 20 as long as they are non-parallel. With the first and second revolute joint 22 and 23 being in series, the end component 40 has two rotational degrees of freedom relative to the joint body 20.

Referring back to FIG. 1, the mechanism 100 includes a second tetrahedral structure formed by the fourth and fifth actuator limbs A4, A5 and the end component 40. Similar to actuator limbs A2 and A3, each of the actuator limbs A4 and A5 is an elbow-linkage device having a respective actuator arm 3 and forearm 5. The actuator arm 3 is connected to the base 1 by an actuated revolute joint 2 allowing the actuator arm 3 to be rotated upon actuation about an actuator axis which, as illustrated in the embodiment, coincides with the central axis 1a. Each of the actuator limbs A2 and A3 further comprises of a ball-and-socket joint 4 connecting the actuator arm 3 to the forearm 5. The ball-and-socket joint 4 allows the forearm 5 three rotational degrees of freedom relative to the actuator arm 3, including one rotational degree of freedom about a forearm axis 5a. Ideally, as shown in the embodiment, the center points or connection points of the ball-and-socket joints 4 of both actuator limbs A4 and A5 remain in the same plane which is perpendicular to the central axis 1a independent of the state of the respective actuated revolute joints 2. It should be understood that the ball-and-socket joint 4 can be replaced by any joint arrangement allowing three rotational degrees of freedom, as described previously in conjunction with the actuator limbs A2 and A3.

The actuator limbs A4 and A5 are linked together by a second joint assembly J2. More specifically, as illustrated in greater detail by FIG. 2, the forearms 5 of actuator limbs A4 and A5 are rigidly attached to respective yokes 6 which are rotatably connected to a joint body 30 by respective revolute joints 7. The revolute joints 7 allow each of the yokes 6 to independently rotate about a respective fourth and fifth joint axis, which may coincide with a second joint body axis 30b as shown in the embodiment. The joint body 30 generally has the shape of a cross as used in universal joints, but allows three, rather than just two, yokes to be connected to each other. As described previously with respect to the first joint assembly J1, the fourth and fifth joint axes, the second joint body axis 30b and the forearm axes 5a of the respective actuator limbs A4 and A5 may intersect or pass through a second common point P2. Preferably, the second joint body axis 30b is perpendicular to the forearm axes 5a of both actuator limbs A4 and A5.

As shown in FIG. 2, the second joint assembly J2 is further linked to the end component 40. More specifically, a yoke 31 is mounted on the joint body 30 by a third revolute joint 32 allowing rotation about a third revolute axis 30a. The third revolute joint 32, like all other revolute joints of mechanism 100 and other mechanisms disclosed herein, might include two individual bearings. The yoke 31 is further connected to the end component 40 by a fourth revolute joint 33 in series with the third revolute joint 32, allowing rotation about a fourth revolute axis 33a. Preferably, as illustrated in the embodiment, the third revolute axis 30a is generally perpendicular to the fourth and fifth joint axis and the second joint body axis 30b and passes through the second common point P2. Similarly, the fourth revolute axis 33a is ideally perpendicular to the third revolute axis 30a and also passes through the second common point P2. It should be understood that the third and fourth revolute axis could generally have any position and orientation relative to the joint body 30 as long they are non-parallel. With the third and fourth revolute joint 32 and 33 in series, the end component 40 has two rotational degrees of freedom relative to the joint body 30.

Referring back to FIG. 1, the mechanism 100 is generally of a bi-tetrahedral structure. The first tetrahedral structure is formed by the actuator limbs A1, A2, and A3 or, more specifically, by the second limb member 15 and the respective forearms 5 of the actuator limbs A2 and A3. Together, they define the first common point P1. The second tetrahedral structure is formed by the actuator limbs A4 and A5 or, more specifically, by the respective forearms 5 of the actuator limbs A4, A5 and the end component 40. Together, they determine the position of the second common point P2. Moreover, the first and second common point P1 and P2 define the position and orientation of the end component 40 which therefore has three actuated translational and two actuated rotational degrees of freedom relative to the base 1. In the embodiment illustrated, the actuator axes of the actuated revolute joints 2 of the respective actuator limbs A2, A3, A4 and A5 coincide with the central axis 1a. In such an arrangement, it is possible to rotate the end component 40 about the central axis 1a by a full 360 degrees or multiples of 360 degrees in a rigid-body fashion without having any relative motion between the actuator limbs A1, A2, A3, A4, A5. This results in a large cylindrical workspace and a workspace-to-footprint ratio similar to that of serial mechanisms such as SCARA robots.

Figure 6:
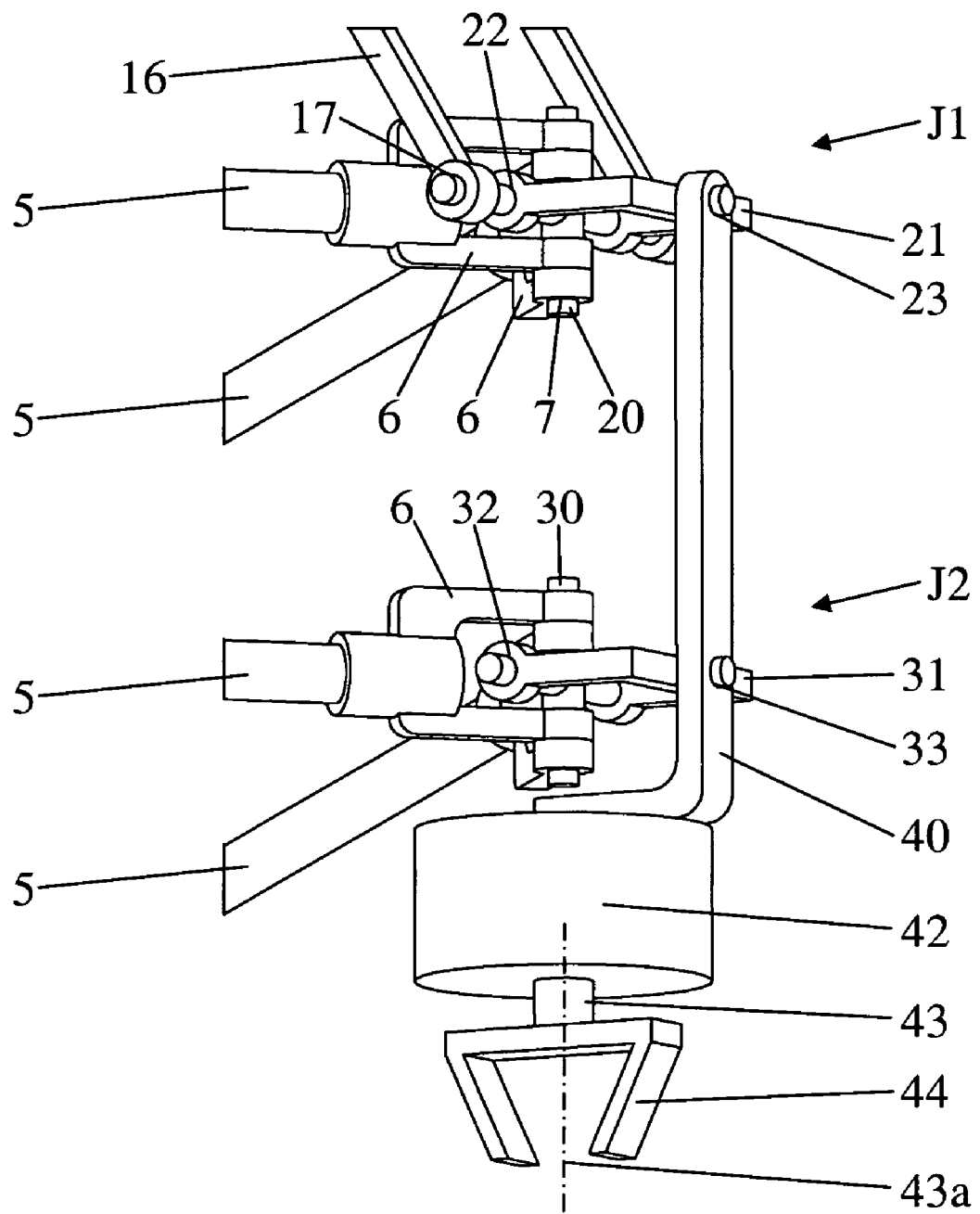
FIG. 6 is a perspective and detailed view of the bi-tetrahedral parallel kinematics mechanism as seen in the embodiment of FIG. 1, the mechanism having an additional actuator mounted on the end component to rotationally drive a work tool with six degrees of freedom.

As shown in FIG. 1, the end component 40 can support an end-effector or work tool 41, such as a gripper, pickup tool, welding device, drill or milling device, cutting tool, press element, sensor or any other kind of end-effector. Moreover, as illustrated in greater detail in FIG. 6, a sixth actuated degree of freedom can be added to the mechanism 100 and other mechanisms described herein by a motor or actuator 42 which is mounted on the end component 40. In the embodiment the actuator 42 rotationally drives an actuator shaft 43 about an axis 43a. The actuator shaft 43 carries an end-effector or work tool 44 to perform a desired operation or manipulation. The work tool 44 thereby has three actuated translational and three actuated rotational degrees of freedom relative to the base 1.

Furthermore, it should be understood that the mechanism 100 as shown in FIG. 1, and other mechanisms described herein, may be controlled by one or more computers (not shown). The computer is operable to controllably move the mechanism, and the computer can instruct the actuator limbs to move in a desired manner. In a generally known manner, the computer receives various feedback inputs which indicate the position and status of the mechanism, such as signals transmitted from sensors located at the respective actuators. From this actuator position information, the computer can calculate the position and orientation of the end-effector or work tool, as is generally known in the art. This type of calculation is generally known as forward kinematics. The advantageous design of the joint assemblies disclosed herein facilitates a closed-form solution to this forward kinematics calculation, as will be recognized by those skilled in the art. This enables greatly simplified mathematics and faster processing by the computer.

Included in the concept of the invention is that the actuation of the four actuated revolute joints 2 of the actuator limbs A2, A3, A4, A5 in the mechanism 100, and other mechanisms disclosed herein, can be achieved by direct actuation, transmissions such as gearboxes, hollow shafts or any other type of transmission arrangement built into or mounted onto the fixed base 1 and connected to the actuated revolute joints 2. Such a base-integrated actuation arrangement facilitates simple and cost-efficient cable management as the utility lines or cables remain stationary. Moreover, it enhances the modularity and thereby the scalability of mechanisms built in accordance with the invention. For example, the size of the workspace can easily be managed by varying the lengths of the forearms 5 and the actuator arms 3.

Figure 3:
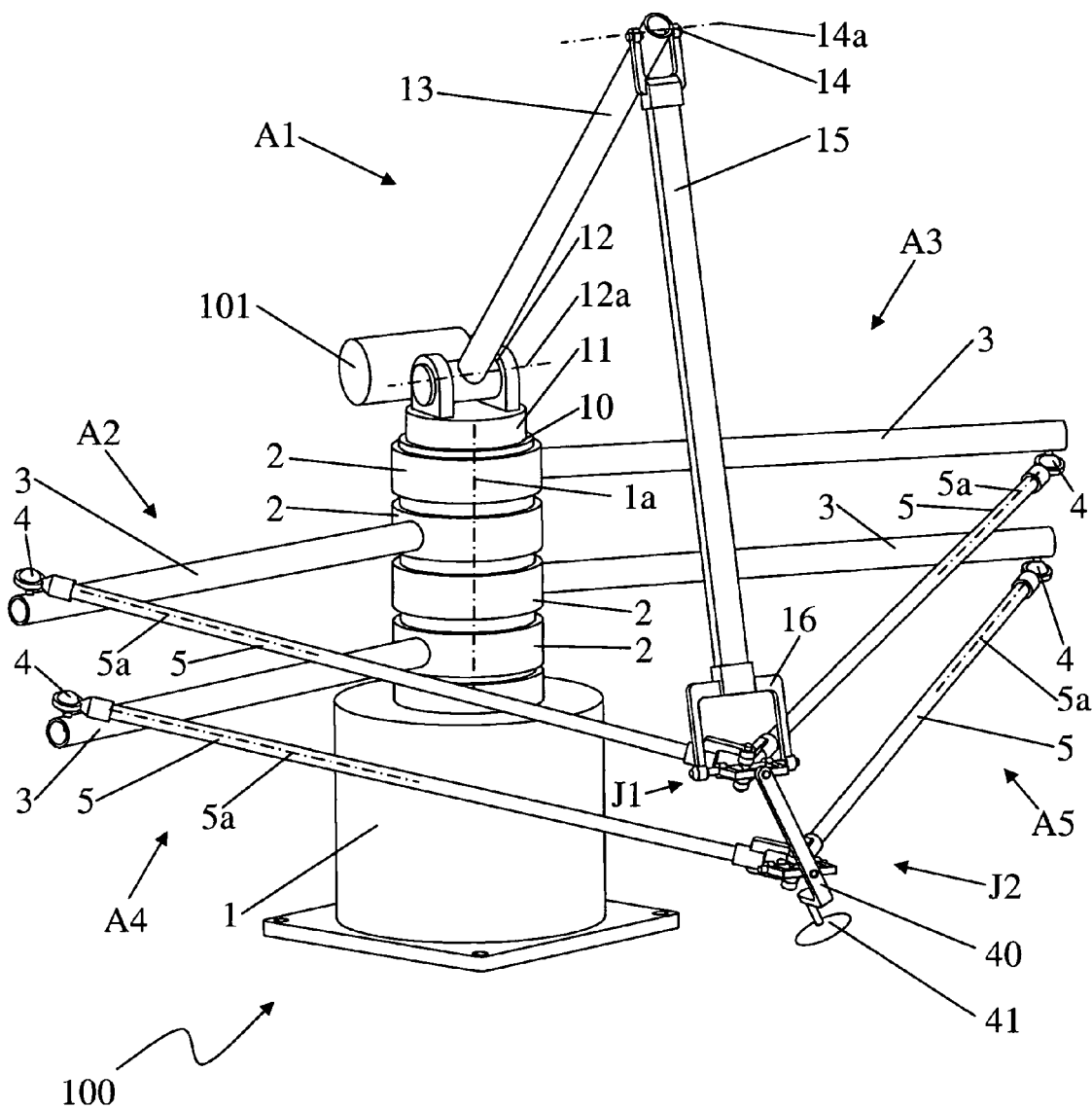
FIG. 3 is a perspective view of the bi-tetrahedral parallel kinematics mechanism as shown in the embodiment of FIG. 1, the end component of the mechanism having a different position and orientation.

FIG. 3 illustrates the same mechanism 100 as seen in the embodiment of FIG. 1. However, the end component 40 and the work tool 41 are shown in another position and orientation relative to the base 1. More specifically, the first limb member 13 of the first actuator limb A1 has been rotated further inside the volume enclosed by the five actuator limbs A1, A2, A3, A4, and A5, causing the end component 40 to move downwards. Moreover, the actuator arms 3 of the second and third actuator limbs A2 and A3 have been rotated clockwise, moving the first joint assembly J1 to the left and influencing or correcting the radial orientation of the first actuator limb A1 accordingly. The platform 11 has inherently rotated such that the first limb member 13 remains at equal angular distance from the actuator arms 3 of the second and third actuator limbs A2 and A3. The actuator arms 3 of the fourth and fifth actuator limbs A4 and A5 have also been rotated clockwise, however the amount of rotation is less than that of the actuator limbs A2 and A3, causing the second joint assembly J2 to shift to the left by a smaller amount than the first joint assembly J1. As illustrated in the embodiment, this causes the end component 40 to tilt sideways. Not shown in the embodiment is a greater radial displacement of the end component 40 which can be achieved by rotating the actuator arms 3 of the actuator limbs A2, A3 and A4, A5 relative to each other. For example, reducing the angular distance between respective pairs of opposite actuator arms 3 would urge the end component to move away from the central axis 1a in a radial direction.

Figure 5:
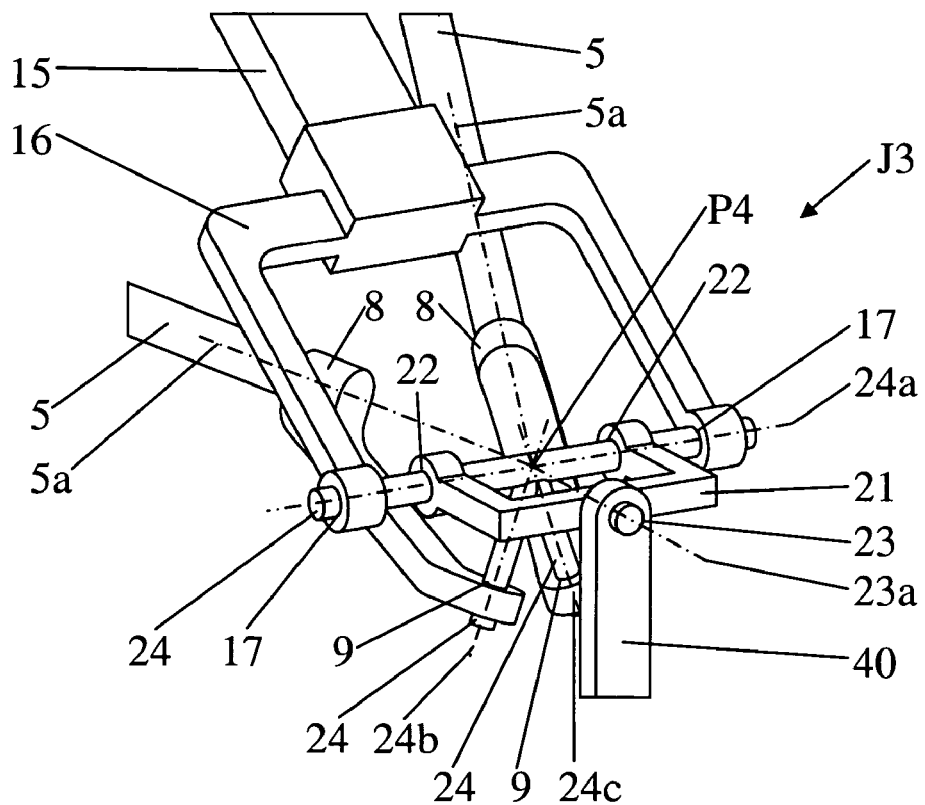
FIG. 5 is a perspective and detailed view of an alternative design of the first joint assembly as seen in the embodiment of FIG. 2.

FIG. 5 shows an alternative design of a joint assembly which can replace the first joint assembly J1 in mechanism 100 and other mechanisms described herein. The joint assembly J3 is generally similar to the first joint assembly J1 except that in the joint assembly J3 the second joint axis and the third joint axis do not coincide. More specifically, the second limb member 15 of the actuator limb A1 has a rigidly attached yoke 16 which is movably connected to a joint body 24 by a revolute joint 17 allowing the yoke 16 to rotate about a first joint axis 24a. The forearms 5 of actuator limbs A2 and A3 are rigidly attached to respective elbows 8 which are movably connected to the joint body 24 by respective revolute joints 9 allowing each of the elbows 8 to rotate about respective second and third joint axis 24b and 24c. The first, second, and third joint axes 24a, 24b, 24c and the forearm axes 5a intersect or pass through a common point P4. The joint assembly J3 further connects to the end component 40 in the manner previously described in conjunction with the first joint assembly J1. It should be understood that non-coincident but intersecting second and third joint axes 24b and 24c as illustrated in FIG. 5 can also be used for the second joint assembly J2 of mechanism 100 and other mechanisms disclosed herein.

Figure 17:
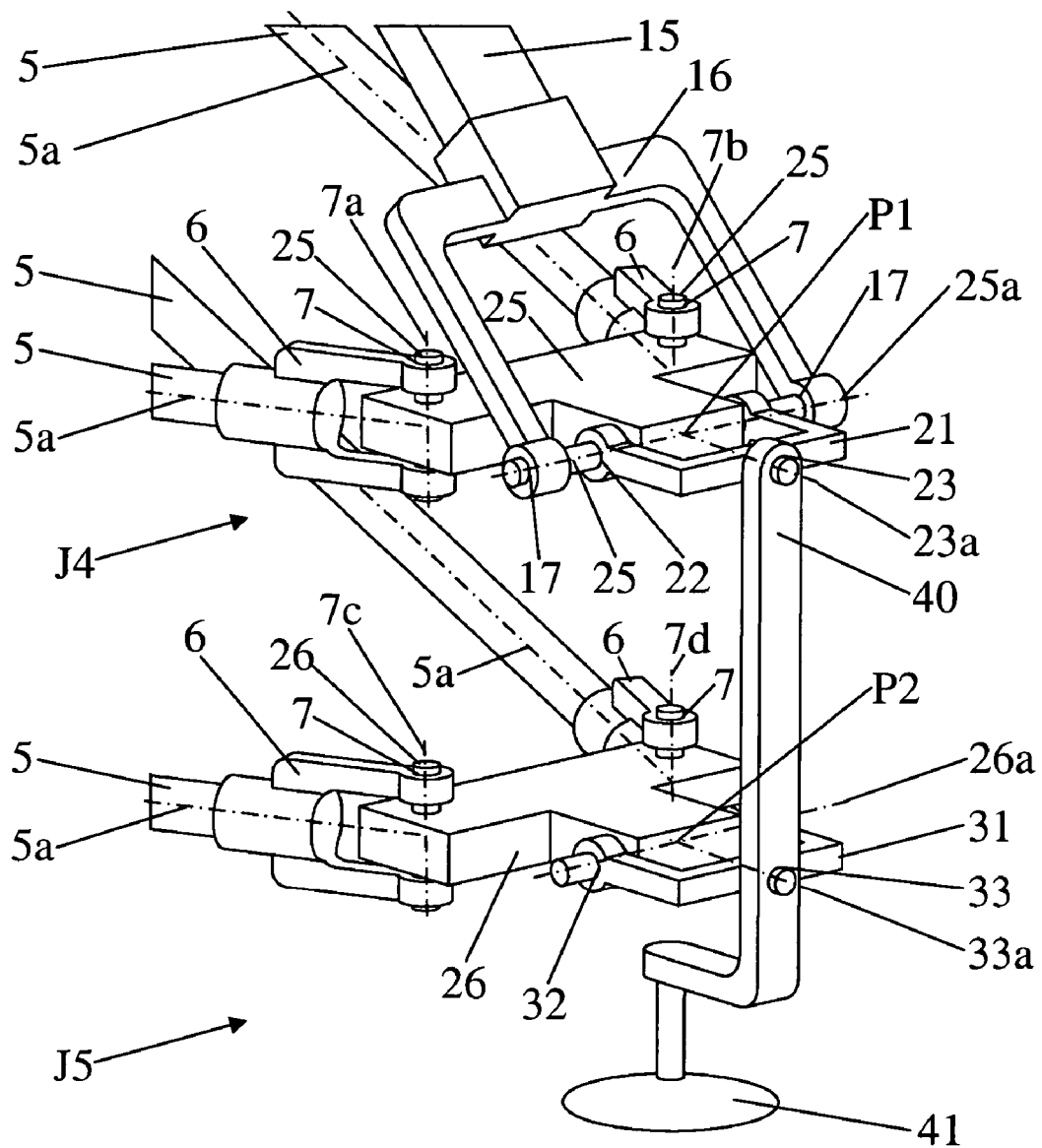
FIG. 17 is a perspective and detailed view of an alternative design of the first and second joint assembly as seen in the embodiment of FIG. 2.

Referring now to FIG. 17, another embodiment is shown with an alternative design of the first and second joint assembly J1 and J2 used in mechanism 100 and other mechanisms disclosed herein. The first joint assembly J4 is generally similar to the first joint assembly J1 except that the second joint axis and the third joint axis are parallel and offset from each other. More specifically, yoke 16 of actuator limb A1 and yokes 6 of actuator limbs A2 and A3 are connected to a joint body 25 via respective revolute joints 17 and 7 allowing yoke 16 to rotate about a first joint axis 25a and yokes 6 to rotate about respective second joint axis 7a and third joint axis 7b. Preferably, the second and third joint axes 7a and 7b are perpendicular to the first joint axis 25a and symmetrically offset with respect to the plane of symmetry which is ideally perpendicular to the first joint axis 25a and passes through the central axis 1a of mechanism 100 and other mechanisms disclosed herein. Not shown in the embodiment is that the second and third joint axes 7a and 7b can be offset from each other but intersect joint axis 25a. Also, the second and third joint axes 7a and 7b could coincide and lie in the plane of symmetry but be offset from the first joint axis 25a. It should be noted that any of the described offset axis arrangements allows a closed-form solution of the forward kinematics of mechanism 100 and can also be combined with any other mechanism disclosed herein. Within the concept of this invention is that the yokes 16, 6, and 21 as shown in the embodiment of FIG. 17 could be replaced by hinges.

Moreover, the second joint assembly J5 is generally similar to the second joint assembly J2 except that the fourth joint axis and the fifth joint axis are parallel and offset from each other. More specifically, yokes 6 of actuator limbs A4 and A5 are connected to a joint body 26 via respective revolute joints 7 allowing yokes 6 to rotate about respective fourth joint axis 7c and fifth joint axis 7d. The joint body 26 is further connected to yoke 31 by a third revolute joint 32 allowing rotation about a revolute axis 26a. Preferably, the fourth and fifth joint axes 7c and 7d are perpendicular to the revolute axis 26a. Not shown in the embodiment is that the fourth and fifth joint axes 7c and 7d can be offset from each other but intersect revolute axis 26a. Also, the fourth and fifth joint axes 7c and 7d could coincide with each other and be offset from the second common point P2.

Figure 7:
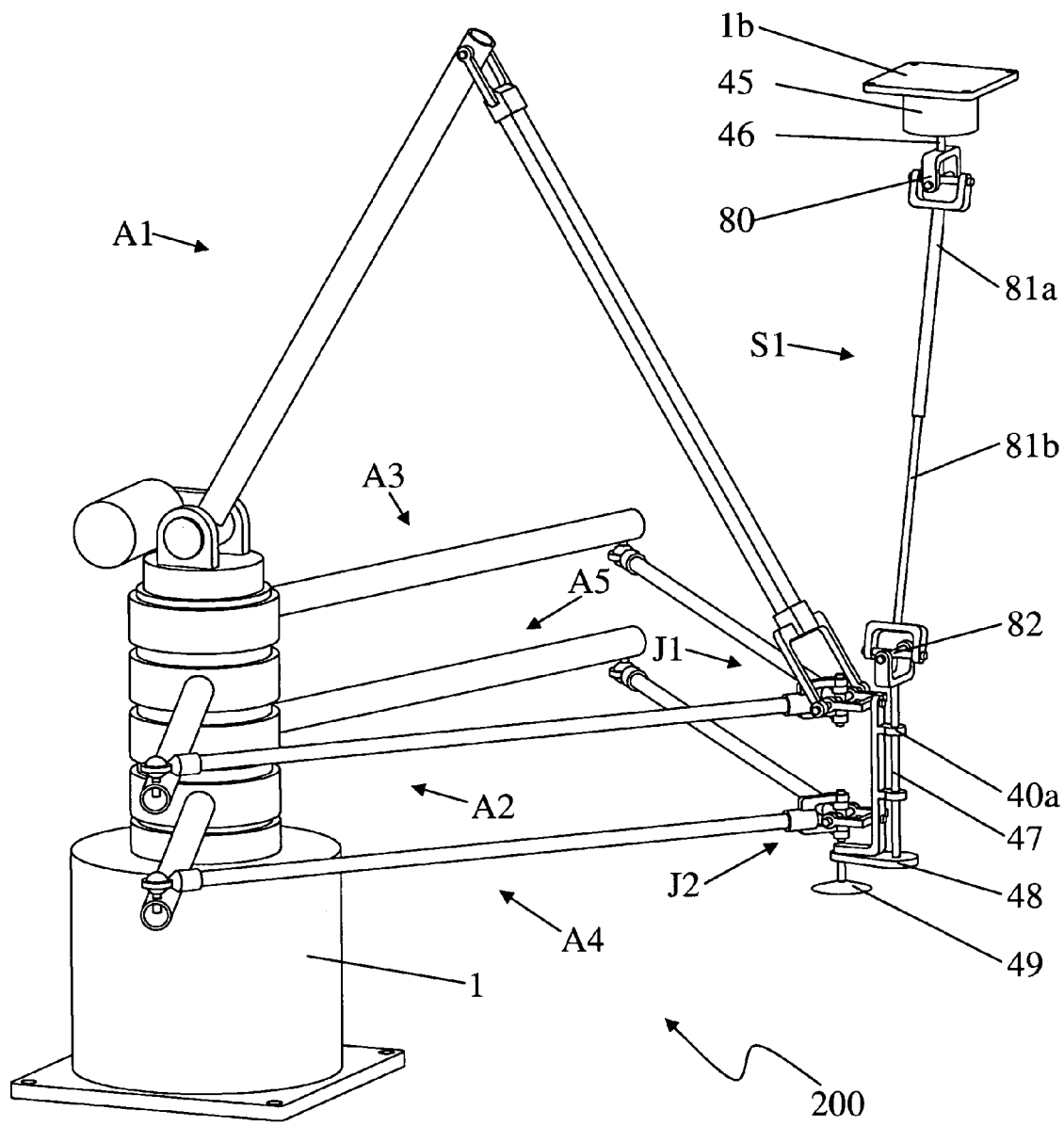
FIG. 7 is a perspective view of another bi-tetrahedral parallel kinematics mechanism constructed in accordance with the invention, the mechanism having an additional actuator mounted to a fixed frame or base and rotationally driving a work tool via a telescopic spline shaft assembly, the work tool having six degrees of freedom.

Turning to FIG. 7, another mechanism 200, constructed in accordance with the teachings of the present invention, for positioning and orienting a work tool in space with six degrees of freedom is shown. The mechanism 200 is similar to the embodiment of FIG. 1, except that mechanism 200 is equipped with an additional motor or actuator 45 mounted to a fixed frame to rotationally drive an end-effector or work tool 49. The mechanism 200 therefore provides six degrees of freedom at the work tool 49 relative to the base 1. As shown in FIG. 7, the actuator 45 is rigidly mounted to a base 1b which is fixed in space and immovable relative to the base 1. The actuator 45 rotates a shaft 46 which transmits the rotation to a shaft 47 via a spline-shaft assembly S1. The shaft 46 is connected to a first universal joint 80. The first universal joint 80 drives female and male spline shaft members 81a and 81b which adjust relative to each other depending on the position and orientation of the work tool 49 relative to the base 1b. A second universal joint 82 connects the male spline shaft member 81b to the shaft 47 which is movably mounted to an end component 40a. The end component 40a is connected to the first and second joint assemblies J1 and J2 in the same manner as described for the end component 40 in conjunction with FIG. 1. As illustrated in the embodiment, the shaft 47 transmits the rotation to the work tool 49 via a gear 48. It should be understood that the work tool 49 could directly be connected to the shaft 47. Moreover, the work tool 49 could be replaced by a gripper, pickup tool, welding device, cutting tool, press element, sensor or any other kind of end-effector. It is further understood that the spline shaft assembly S1 could be replaced by any other arrangement that is able to transmit a torque to the work tool 49.

Figure 8:
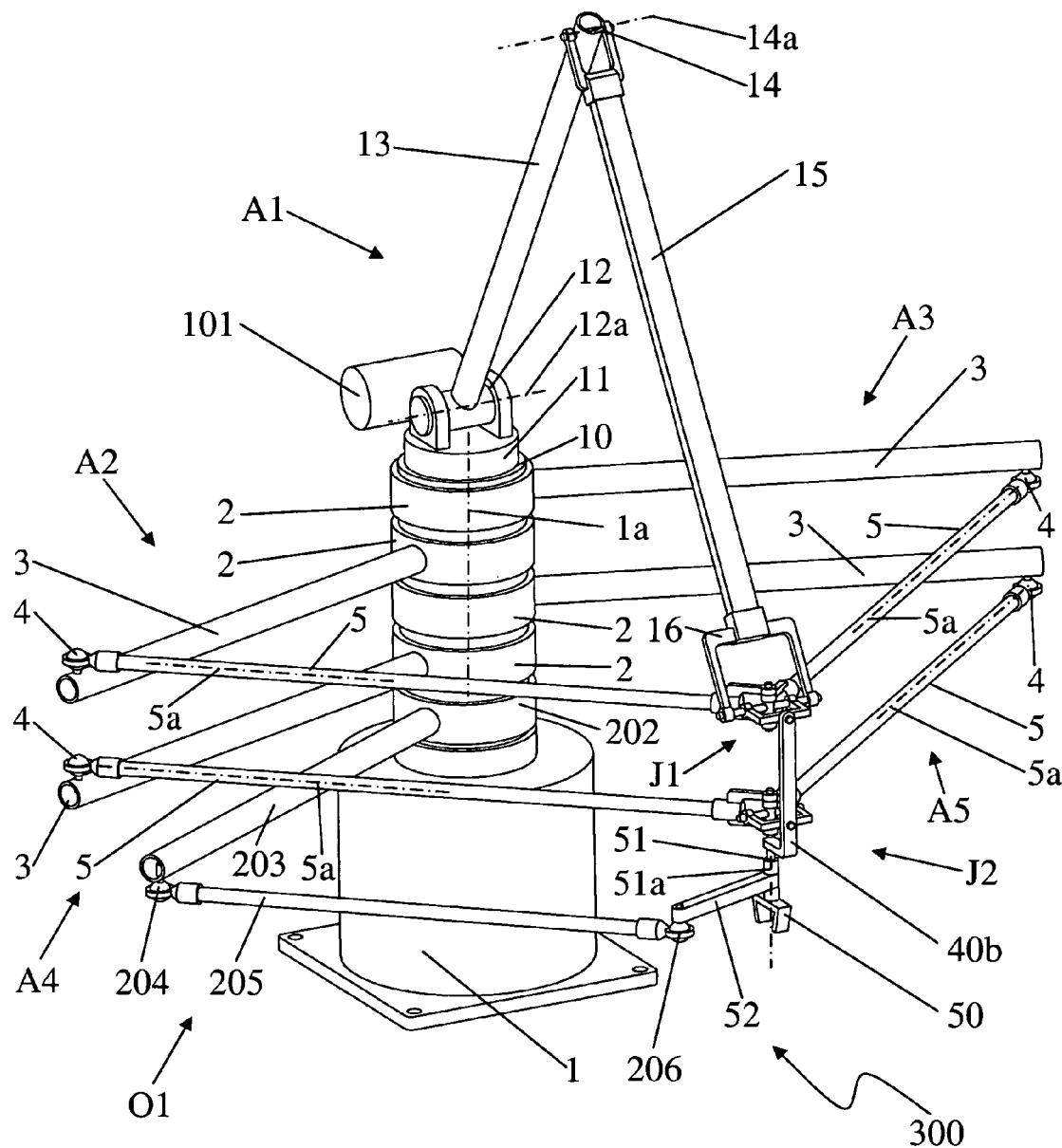
FIG. 8 is a perspective view of another bi-tetrahedral parallel kinematics mechanism constructed in accordance with the invention, the mechanism having an additional actuator to orient a work tool via an elbow-linkage, the work tool being movably mounted to the end component and having six degrees of freedom.

FIG. 8 shows another mechanism 300 for positioning and orienting a work tool in space with six degrees of freedom. The mechanism 300 is similar to the embodiment of FIG. 1, except that mechanism 300 is equipped with an additional motor or actuator orienting an end-effector or work tool 50 relative to an end component 40b via an orienting linkage O1. More specifically, as illustrated in the embodiment, the end-component 40b is mounted onto the first and second joint assembly J1 and J2 in the same manner as described previously for the end component 40 in the embodiment of FIG. 1. The end component 40b is further connected to the work tool 50 by a revolute joint 51 allowing rotation about a work tool axis 51a which, as shown in the embodiment, may pass through the first and second common point of the first and second joint assembly J1 and J2. The work tool 50 has a rigidly connected lever 52 which is driven by the orienting linkage O1.

As shown in FIG. 8, the orienting linkage O1 comprises an actuated revolute joint 202 which is mounted to the base 1 and pivots an orienting arm 203. Preferably, the axis of rotation of the actuated revolute joint 202 coincides with the central axis 1a to allow mechanism 300 to entirely swing around the central axis 1a in a rigid-body fashion. An orienting link 205 links the orienting arm 203 to the lever 52 via a first and a second ball-and-socket joint 204 and 206. It is understood that either one of the ball-and socket joints could be replaced by a universal joint, or that the ball-and-socket joints could be replaced by any joint arrangement that allows three degrees of freedom.

Upon actuation of the actuated revolute joint 202, the orienting linkage O1 causes the work tool 50 to rotate about the work tool axis 51a. As will be apparent to those skilled in the art, the work tool axis 51a can be mounted to the end component 51 in any position and orientation. For example, if the work tool 50 is a circular turret or tool changer, the work tool axis 51a can be made parallel to the first joint axis of the first joint assembly J1 such that the tool changer rotates about the work tool axis 5a and selectively engages various tools.

Figure 9:
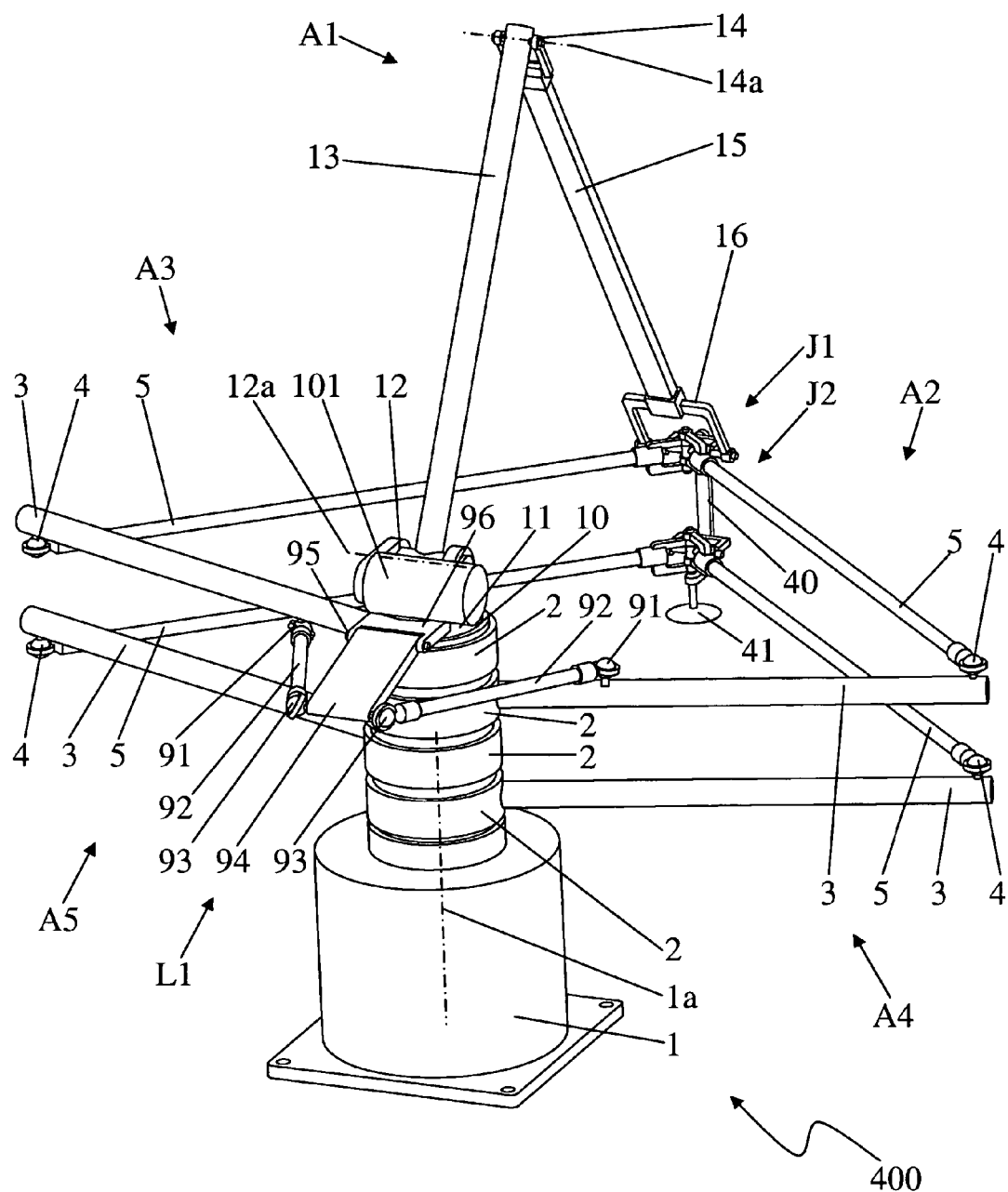
FIG. 9 is a perspective view of another bi-tetrahedral parallel kinematics mechanism constructed in accordance with the invention, the mechanism having five actuator limbs with an elbow-linkage design, three of which are connected with an additional outer linkage to influence the radial orientation of one of them.

FIG. 9 illustrates another mechanism 400 for positioning and orienting a work tool in space with five degrees of freedom. The mechanism 400 is similar to the embodiment of FIG. 1, except that mechanism 400 further comprises influencing means or, more specifically, a linkage L1. The linkage L1 influences the radial orientation of the actuator limb A1 or the angular position of the platform 11 about the central axis 1a relative to the angular position of the actuator arms 3 of the second and third actuator limb A2 and A3 about the central axis 1a.

The linkage L1 comprises two influencing arms 92 which are connected to respective actuator arms 3 of the second and third actuator limb A2 and A3 by first influencing joints with two or three degrees of freedom. In the illustrated embodiment, a ball-and-socket-joint 91 is used for each connection. The influencing arms 92 are further connected to a guiding arm 94 by second influencing joints with two or three degrees of freedom. This connection is achieved, as shown in FIG. 9, by two ball-and-socket joints 93 which could be replaced by any joint arrangement that allows each of the influencing arms 92 two or three degrees of freedom relative to the guiding arm 94. For example, the two ball-and-socket joints could be made concentric. It should be understood that either one of the respective ball-and-socket joints 91 and 93 of a respective influencing arm 92 could be replaced by a universal joint to restrict the free rotation of the influencing arms 92 about their longitudinal axes. Any of the ball-and-socket joints could also be substitute by three single-axis revolute joints. If desired, the guiding arm 94 could be divided into two outer guiding links which would transmit a torque about the central axis 1a not as a bending moment but as pure compression or pulling forces.

The guiding arm 94 is further connected to a mounting arm 96 by a revolute joint 95, the mounting arm 96 being rigidly attached to the platform 11 of the first actuator limb A1. When the angle between the two actuator arms 3 of the second and third actuator limbs A2 and A3 changes, the two influencing arms 92 force the outer end of the guiding arm 94 to move up or down on an arc about the axis of rotation of the revolute joint 95. Thus, the linkage L1 is capable of compensating for changes in the angular distance of the two actuator arms 3 of the second and third actuator assembly A2 and A3.

The linkage L1 furthermore urges the platform 11 to rotate about the central axis 1a depending on the position of the actuator arms 3 and the state of the actuated revolute joints 2 of the second and third actuator limbs A2, A3. Preferably, the linkage L1 has a symmetric design, i.e. the length of the two influencing arms 92 is the same, the location of the two ball-and-socket joints 91 is equidistant from the central axis 1a, and the axis of rotation of the revolute joint 95 is parallel to the primary axis 12a and the secondary axis 14a. Given the symmetric design, the linkage L1 ensures that the horizontal projection of the first and second limb member 13 and 15 of the first actuator limb A1 always lies midway between the actuator arms 3 of the second and third actuator limb A2, A3. In other words, the angular distances of the first and second limb member 13 and 15 measured from the actuator arms 3 of the second and third actuator limbs A2, A3 are constrained to be substantially equal. The linkage L1 thus provides a similar function as described in conjunction with the embodiment of FIG. 1, i.e. it supports the rotation of the actuator limb A1 about the central axis 1a when the position of the actuator limbs A2 and A3 changes. The linkage L1 thereby acts like a differential mechanism preventing any angular differences between the first limb member 13 and the actuator arms 3 of the actuator limbs A2, A3.

Figure 10:
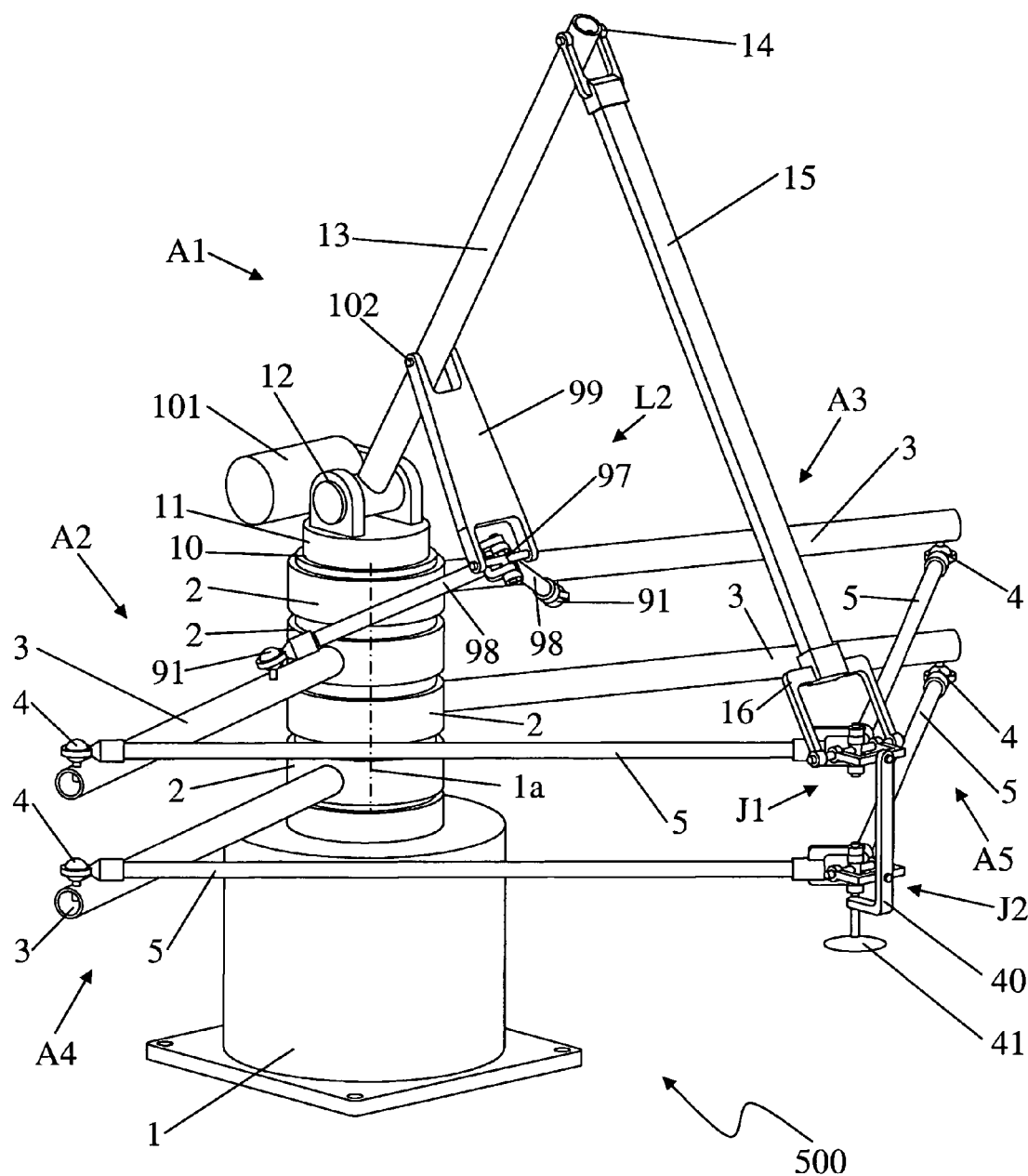
FIG. 10 is a perspective view of another bi-tetrahedral parallel kinematics mechanism constructed in accordance with the invention, the mechanism having five actuator limbs with an elbow-linkage design, three of which are connected with an additional inner linkage to influence the radial orientation of one of them.
Figure 13:
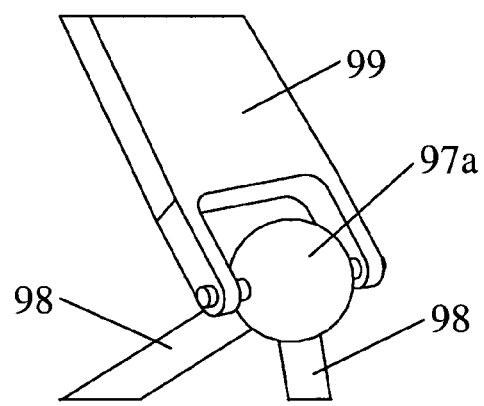
FIG. 13 is a perspective and detailed view of an alternative joint arrangement that can be used in the linkage as shown in the embodiment of FIG. 10.

Turning now to FIG. 10, another mechanism 500 for positioning and orienting a work tool in space with five degrees of freedom is illustrated. The mechanism 500 is similar to the embodiment of FIG. 9, except that mechanism 500 uses alternative influencing means or, more specifically, an alternative linkage L2 that performs the same function as the linkage L1 described previously. More specifically, the linkage L2 comprises two influencing arms 98 and a guiding arm 99. The two influencing arms 98 are connected to the respective actuator arms 3 of the second and third actuator limb A2 and A3 by first influencing joints with at least two degrees of freedom. As shown in the embodiment, two ball-and-socket joints 91 are used for this connection. The inner end of guiding arm 99 is connected to the first limb member 13 of the actuator limb A1 by a revolute joint 102, while the outer end of guiding arm 99 is linked to the two influencing arms 98 by second influencing joints, which are integrated and designed as a double-hookes joint 97 in FIG. 10. The double-hookes joint comprises of a cross and three yokes, one of which is rotatably mounted to the first bar of the cross, and two of which are rotatably mounted to the second bar of the cross so that they rotate about the same axis. As an alternative to the double-hookes joint 97, separate or concentric ball-and-socket joints may be used to connect the two influencing arms 98 to the guiding arm 99. Such a concentric ball-and-socket joint arrangement 97a is shown in greater detail in FIG. 13.

Preferably, the linkage L2 has a symmetric design as described previously for the linkage L1 in conjunction with FIG. 9. It should be understood that the joint arrangements to connect the guiding arm and the respective influencing arms in FIGS. 9 and 10 are interchangeable, i.e. the double-hookes joint 97 could also be used to connect the guiding arm and the influencing arms of the linkage L1 while two separate ball-and-socket joints 93 could be used to link the guiding arm and the influencing arms of the linkage L2. Moreover, the linkages L1 and L2 may be combined with other mechanisms described herein.

Figure 11:
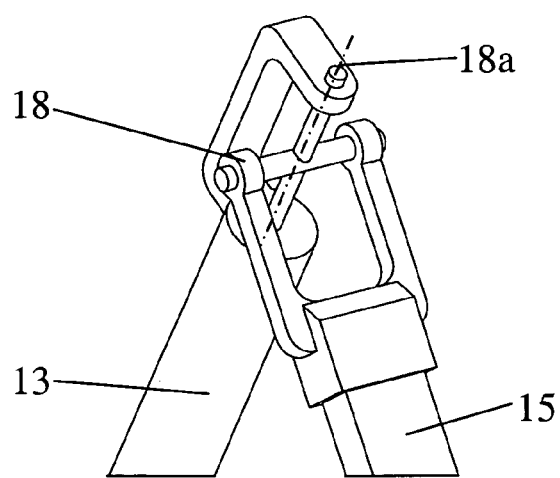
FIG. 11 is a perspective and detailed view of an alternative joint that can be used in conjunction with the embodiments of FIGS. 9 and 10.
Figure 12:
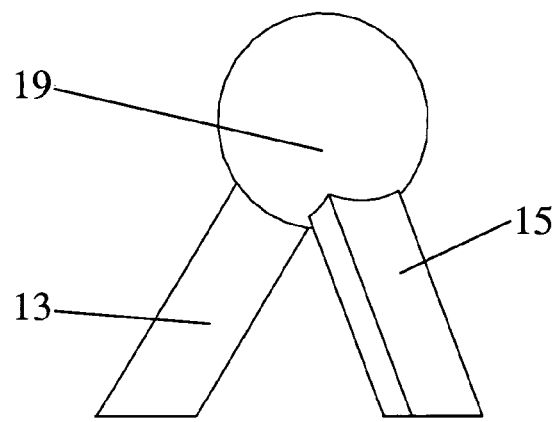
FIG. 12 is a perspective and detailed view of another alternative joint that can be used in conjunction with the embodiments of FIGS. 9 and 10.

Since both linkages L1 and L2 in FIGS. 9 and 10 ensure a guided rotation of the platform 11 as described above, they relieve the overall structure of the parallel kinematics mechanisms. More specifically, they reduce bending moments in the first and second limb member 13 and 15 and compression or pulling forces in the forearms 5 of the actuator limbs A2 and A3. The radial orientation of the first actuator limb A1 no longer has to be constrained by the first and second limb member 13 and 15 and the first joint assembly J1. Therefore, as shown in FIG. 11 in greater detail, it should be understood that the revolute joint 14 could now be substituted by a universal joint 18 that allows the second limb member 15 to not only rotate about the secondary axis 14a but also to pivot sideways about a tertiary axis 18a relative to the first limb member 13. In addition to the universal joint 18, another degree of freedom (not shown) can be introduced between the second limb member 15 and the joint body 20 of the first joint assembly J1 seen in the embodiment of FIG. 2. As an alternative to the universal joint 18 and the additional degree of freedom between the second limb member 15 and the joint body 20, a joint 19 with three degrees of freedom, such as a ball-and-socket joint, could replace the revolute joint 14 and connect the first and second limb member 13 and 15, as shown in greater detail in FIG. 12.

Figure 14:
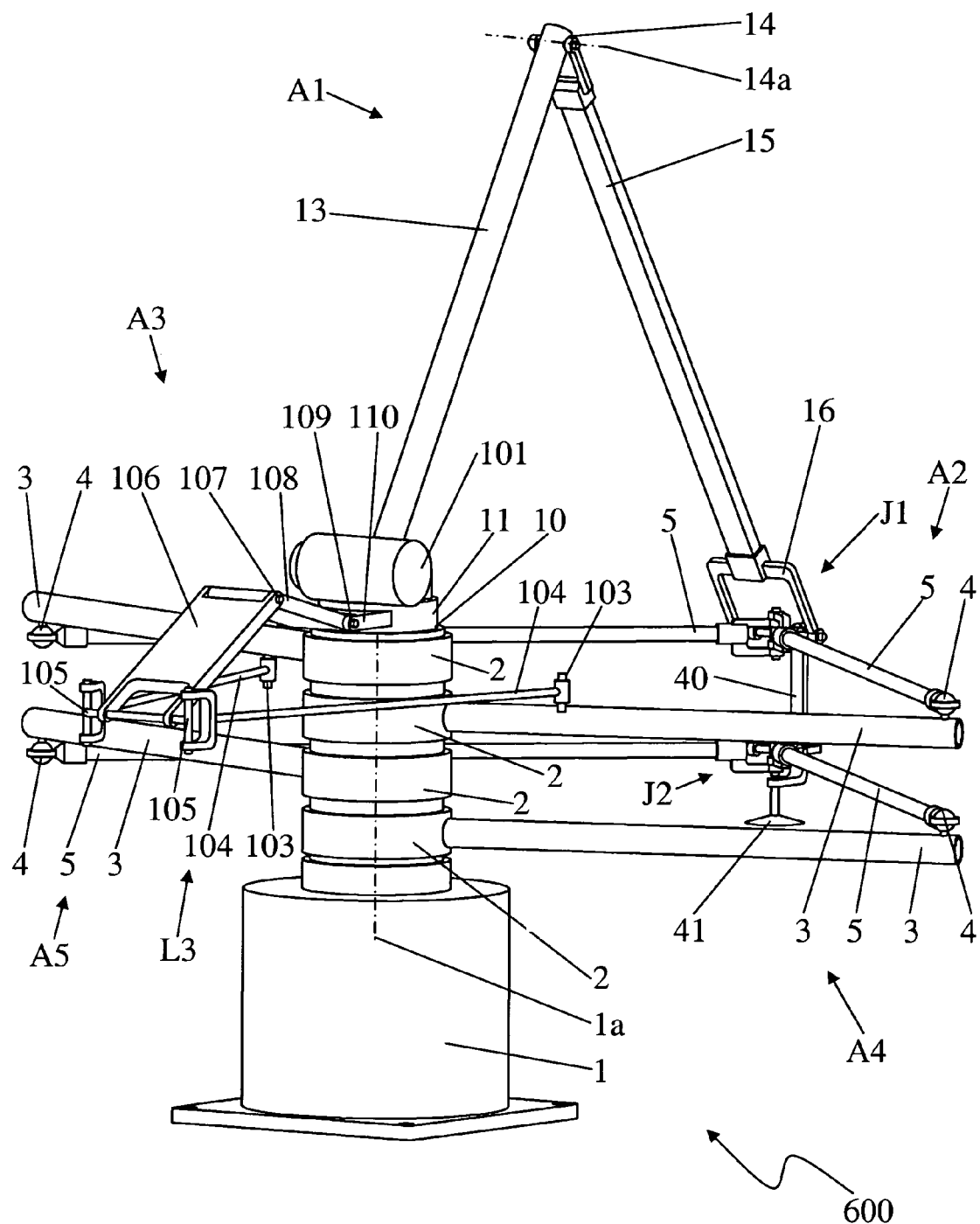
FIG. 14 is a perspective view of another bi-tetrahedral parallel kinematics mechanism constructed in accordance with the invention, the mechanism having five actuator limbs with an elbow-linkage design, three of which are connected with another outer linkage to influence the radial orientation of one of them.

Referring to FIG. 14, another mechanism 600 for positioning and orienting a work tool in space with five degrees of freedom is illustrated. The mechanism 600 is similar to the embodiment of FIG. 9, except that mechanism 600 uses alternative influencing means or, more specifically, an alternative linkage L3 that performs the same function as the linkages L1 and L2 previously described. The linkage L3 comprises two influencing arms 104 and a first and a second guiding arm 108 and 106. The two influencing arms 104 have first and second ends, the first ends being connected to the actuator arm 3 of a respective one of the second and third actuator limbs A2 and A3 by a revolute joint 103 whose axis of rotation is parallel to the central axis 1a. The second ends of the influencing arms 104 are mounted to the second guiding arm 106 by influencing joints or, as shown in the embodiment, universal joints 105. As will be recognized by those skilled in the art, the universal joints 105 could be combined to a double-hookes joint, as described in conjunction with FIG. 10. Also, they could be replaced by ball-and-socket joints, as described in conjunction with FIGS. 9 and 13, or any other joint arrangement that allows the influencing arms 104 to pivot relative to the second guiding arm 106 with at least two degrees of freedom. When the angular distance between the actuator arms 3 of the second and third actuator limbs A2 and A3 changes, the universal joints 105 move either towards or away from the central axis 1a.

The second guiding arm 106 is further connected to the first guiding arm 108 by a revolute joint 107, while the first guiding arm 108 is connected to a mounting arm 110 by a revolute joint 109. The mounting arm 110 is rigidly attached to the platform 11. Ideally, the axes of the revolute joints 107 and 109 are parallel to the primary axis 12a and the secondary axis 14a of the actuator limb A1. Together, the first and second guiding arm 108 and 106 form a hinge that compensates for the varying radial distance of the universal joints 105 from the central axis 1a. As described for the linkages L1 and L2, it is preferred that the linkage L3 has a symmetric design such that the center between the two universal joints 105, the first common point of the first joint assembly J1, and the central axis 1a are coplanar and define a plane which is perpendicular to the primary axis 12a, the secondary axis 14a, the first joint axis of the first joint assembly J1, and the axes of rotation of the revolute joints 107 and 109.

Figure 15:
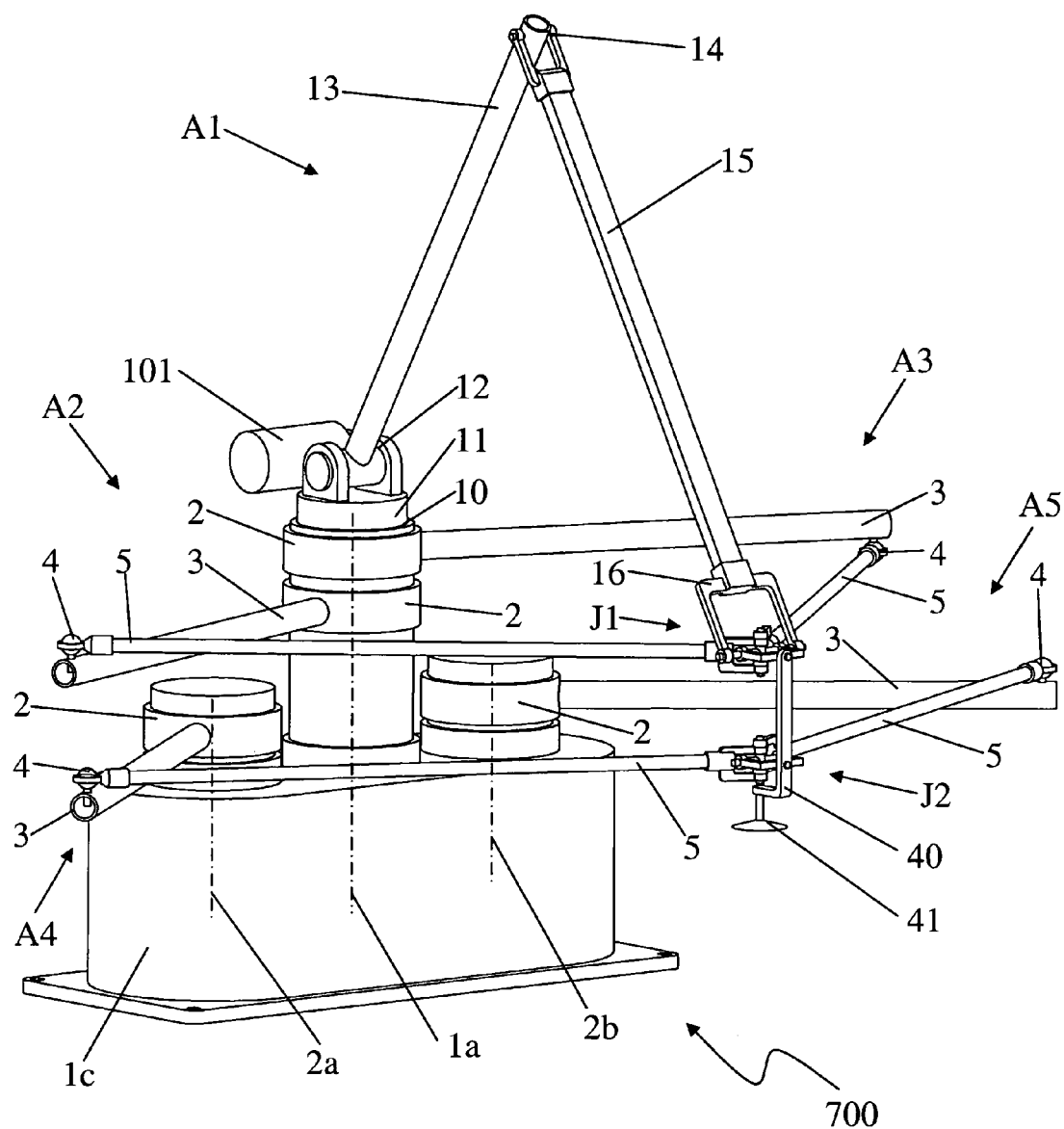
FIG. 15 is a perspective view of another bi-tetrahedral parallel kinematics mechanism constructed in accordance with the invention, the mechanism having five actuator limbs with an elbow-linkage design, three of which are arranged to rotate about a central axis, and two of which have separate, individual axes of rotation, the mechanism positioning and orienting an end component in space with five degrees of freedom.

Referring now to FIG. 15, another mechanism 700, constructed in accordance with teachings of the present invention, for positioning and orienting a work tool in space with five degrees of freedom is shown. The mechanism 700 is similar to the embodiment of FIG. 1, except that in mechanism 700 the actuated revolute joints 2 of the actuator limbs A4 and A5 rotate about respective actuator axes which are parallel to but not coincident with the central axis 1a. As shown in the embodiment, a fixed base 1c comprises the central axis 1a and two offset axes 2a and 2b. The fourth and fifth actuator limbs A4, A5 are mounted to the base 1c such that their actuated revolute joints 2 allow rotation about actuator axes which respectively coincide with the offset axes 2a and 2b. The embodiment illustrated in FIG. 15 facilitates a simpler design of the actuation, or the transmission of actuation, to the four actuated revolute joints 2 of the actuator limbs A2, A3, A4, and A5.

Figure 16:
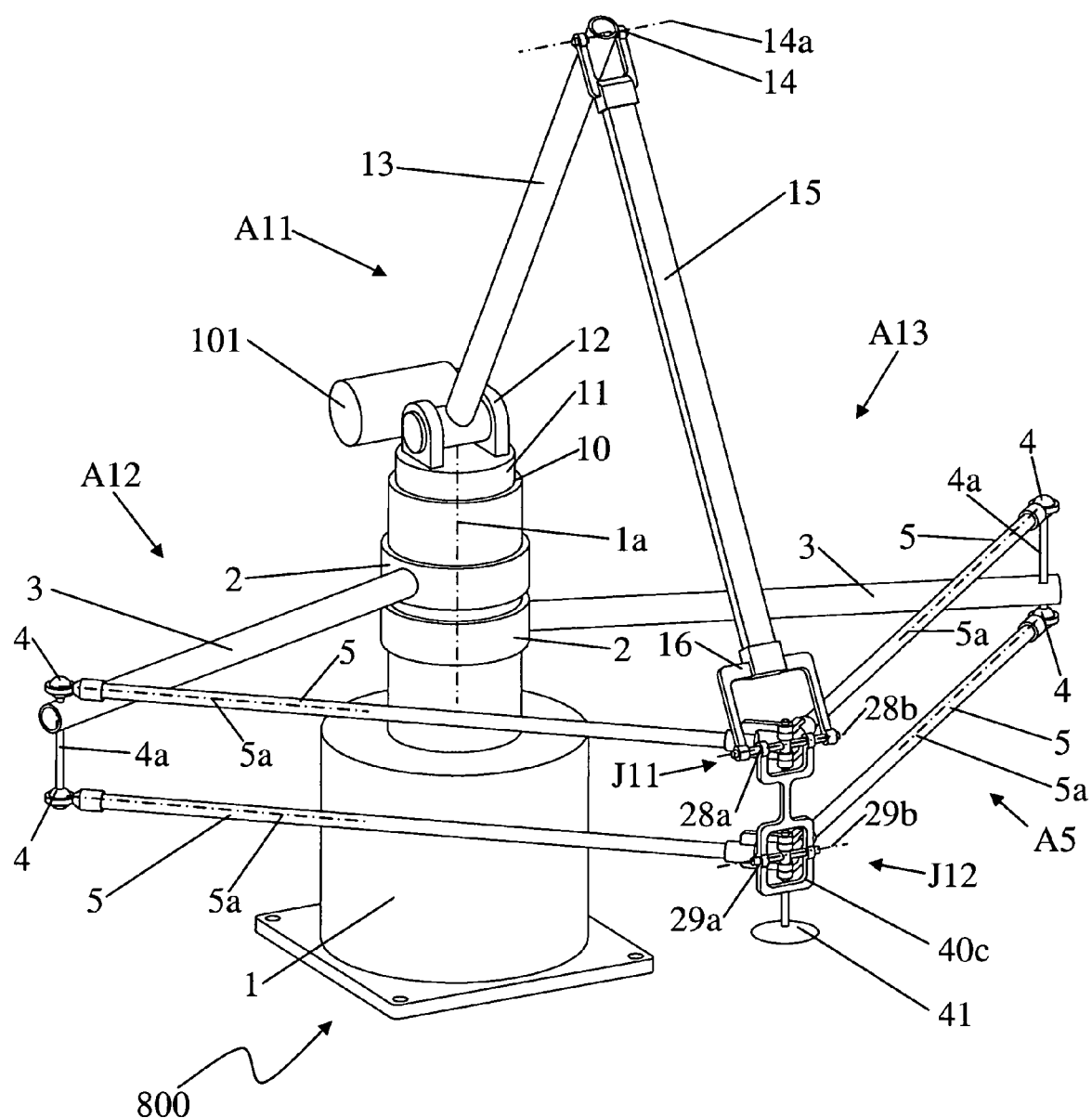
FIG. 16 is a perspective view of another bi-tetrahedral parallel kinematics mechanism constructed in accordance with the invention, the mechanism having three actuator limbs with an elbow-linkage design arranged to rotate about a central axis and to position an end component in space with three degrees of freedom and fixed orientation.

FIG. 16 illustrates a mechanism 800, constructed in accordance with teachings of the present invention, for positioning a work tool in space with three degrees of freedom and a fixed orientation. The mechanism 800 is similar to the embodiment of FIG. 1, except that in mechanism 800 only three actuator limbs A11, A12, and A13 are used to move an end component 40c. The actuator limb A11 has the same structure as the actuator limb A1 as described in conjunction with FIG. 1. Moreover, the actuator limbs A12 and A13 are similar to the actuator limbs A2 and A3 as described in the embodiment of FIG. 1, except that an upper and a lower forearm 5 with respective upper and lower forearm axes 5a are now connected to the same actuator arm 3 via two ball-and-socket joints 4 which are mounted to the actuator arm 3 by an elongated element 4a. The pivot or connection points of the ball-and-socket joints 4 connecting to the upper forearms 5 of the actuator limbs A2 and A3 preferably move in a first plane while the pivot or connection points of the ball-and-socket joints 4 connecting to the lower forearms 5 of the actuator limbs A2 and A3 preferably move in a second plane which is parallel to the first plane and perpendicular to the central axis 1a. Alternative joint arrangements, such as the triple-axis joint assembly shown in the embodiment of FIG. 4, can be used to substitute the ball-and-socket joints 4. In such a case, the two triple-axis joint assemblies mounted to the same actuator arm 3 may share at least one revolute joint or axis of rotation, as shown in FIG. 19 in greater detail.

Figure 19:
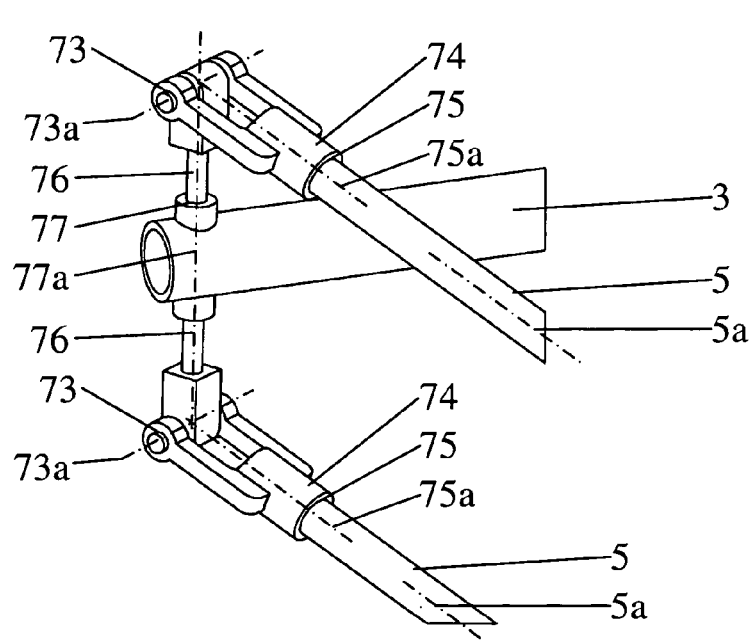
FIG. 19 is a perspective and detailed view of an alternative joint arrangement that can replace the ball-and-socket joints in the elbow-linkages of the mechanism shown in the embodiment of FIG. 16.

As can be seen in FIG. 19, the actuator arm 3 is connected to a common link 76 by a first revolute joint 77 with an axis of rotation 77a. Preferably, axis 77a is parallel to the central axis 1a of mechanism 800. The common link 76 is further connected to both upper and lower forearms 5 via respective second revolute joints 73 with axes of rotation 73a, respective yokes 74 and respective third revolute joints 75 with axes of rotation 75a. Preferably, axes 77a, 73a and 75a pass through a common connection point as shown in FIG. 19. Moreover, the upper and lower forearm axes 5a ideally coincide with the respective axis 75a. The described joint arrangement allows both upper and lower forearms 5a three rotational degrees of freedom with respect to actuator arm 3.

Referring back to FIG. 16, the two joint assemblies J11 and J12 linking the actuator limbs A11, A12, and A13 are similar to the joint assemblies J1 and J2 as described in FIG. 2, except that the end component 40c is directly attached to the respective joint bodies by revolute joints 28a and 29a allowing rotation about a first and a second revolute axis 28b and 29b.

Preferably, the mechanism 800 is designed such that the elongated elements 4a of both actuator limbs A12 and A13, the central axis 1a, and the line connecting the common points of the joint assemblies J11 and J12 are parallel for all poses of the mechanism 800. Thus, the end component 40c and the attached end-effector 41 move parallel to the fixed base 1 without changing their orientation or inclination. Included in the concept of this invention is that the mechanism 800 can be equipped with additional actuators to allow the work tool an additional degree of freedom. Such an actuator can be added to mechanism 800 in similar ways as described in conjunction with FIGS. 6, 7, and 8. Moreover, influencing means or linkages as illustrated in the embodiments of FIGS. 9, 10, 13, and 14 can be used to rotate the platform 11 of the mechanism 800.

Figure 18:
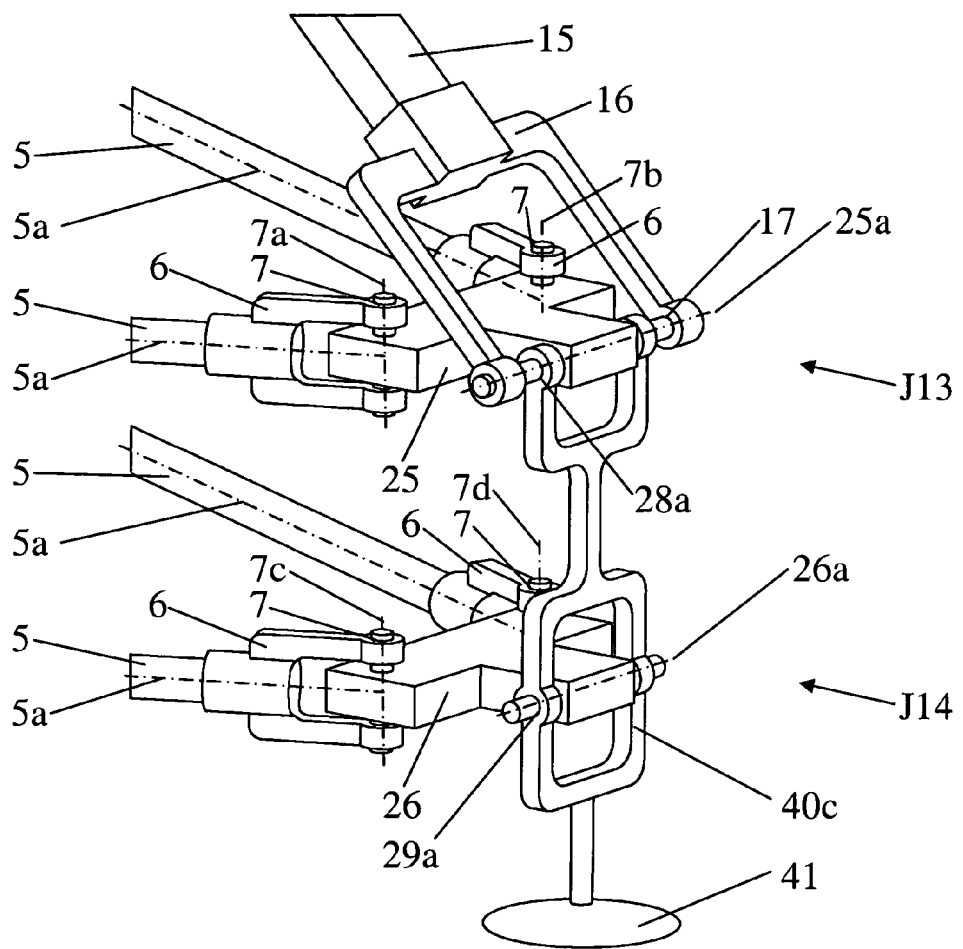
FIG. 18 is a perspective and detailed view of an alternative design of the first and second joint assembly as seen in the embodiment of FIG. 16.

FIG. 18 shows alternative joint assemblies J13 and J14 which can be used in conjunction with mechanism 800 shown in FIG. 16. The first joint assembly J13 is similar to the first joint assembly J4 shown in FIG. 17, except that the end component 40c is directly attached to the joint body 25 by a revolute joint 28a allowing rotation about a first revolute axis which may coincide with the first joint axis 25a. The second joint assembly J14 is similar to the second joint assembly J5 shown in FIG. 17 except that the end component 40c is directly attached to the joint body 26 by a revolute joint 29a allowing rotation about a second revolute axis 26a. Preferably, the second and third joint axes 7a and 7b are perpendicular to the first joint axis 25a and symmetrically offset with respect to the plane of symmetry which is ideally perpendicular to the first joint axis 25a and passes through the central axis 1a mechanism 800. Similarly, the fourth and fifth joint axes 7c and 7d are preferred to be symmetrically offset with respect to said plane.

Although the invention has been described herein in connection with various preferred embodiments, there is no intention to limit the invention to those embodiments. It should be understood that various changes and modifications to the preferred embodiments will be apparent to those skilled in the art. Such changes and modifications may be made without departing from the spirit and scope of the present invention and without diminishing its attendant advantages. Therefore, the appended claims are intended to cover such changes and modifications.

What is claimed is:

1. A mechanism for positioning and orienting an end component in space with at least five degrees of freedom, the mechanism comprising:

a base;

a first actuator limb comprising at least a platform connected to said base by a revolute joint allowing one rotational degree of freedom about a central axis, a first limb member movably connected to said platform with a single actuated degree of freedom relative to said platform, and one and only one second limb member movably connected to said first limb member, said second limb member having at least three degrees of freedom relative to said base, wherein at least one of said degrees of freedom of said second limb member is actuatable relative to said base;

at least second, third, fourth, and fifth actuator limbs, each of the actuator limbs comprising at least an actuator arm rotatably connected to said base by an actuated revolute joint allowing rotation about a respective actuator axis, each of said second, third, fourth, and fifth actuator limbs further comprising one and only one forearm movably connected to said actuator arm of the respective actuator limb, wherein said forearm has at least three degrees of freedom relative to said actuator arm including one free rotational degree of freedom about a respective forearm axis;

a first joint body, wherein said second limb member is rotatably connected to said first joint body and allowed to rotate relative to said first joint body about a first joint axis, and wherein each of the forearms of said second and third actuator limbs is rotatably connected to said first joint body and allowed to rotate relative to said first joint body about a respective second and third joint axis which is non-parallel to said forearm axis of the respective actuator limb;

a second joint body, wherein each of the forearms of said fourth and fifth actuator limbs is rotatably connected to said second joint body and allowed to rotate relative to said second joint body about a respective fourth and fifth joint axis which is non-parallel to said forearm axis of the respective actuator limb; and said end component movably connected to each of said first and second joint bodies, the end component having at least two rotational degrees of freedom relative to each of said first and second joint bodies such that said end component is movable with at least five degrees of freedom relative to said base.

2. A mechanism according to claim 1, wherein the actuator axis of each of said second and third actuator limbs is substantially coincident with said central axis.

3. A mechanism according to claim 1, wherein the actuator axis of each of said fourth and fifth actuator limbs is substantially parallel to said central axis.

4. A mechanism according to claim 1, wherein the actuator axis of each of said fourth and fifth actuator limbs is substantially coincident with said central axis.

5. A mechanism according to claim 1, wherein said second and third joint axes are substantially parallel to each other and perpendicular to said first joint axis.

6. A mechanism according to claim 1, wherein said second and third joint axes are substantially coincident and perpendicular to said first joint axis and wherein said first, second and third joint axes and the forearm axes of said second and third actuator limbs pass through a first common point.

7. A mechanism according to claim 1, wherein said fourth and fifth joint axes are substantially parallel to each other.

8. A mechanism according to claim 1, wherein said fourth and fifth joint axes are substantially coincident and wherein said fourth and fifth joint axes and the forearm axes of said fourth and fifth actuator limbs pass through a second common point.

9. A mechanism according to claim 1, wherein said first limb member is connected to said platform by an actuated revolute joint allowing rotation about a primary axis, and said second limb member is connected to said first limb member by a revolute joint allowing rotation about a secondary axis, and wherein said primary axis, said secondary axis, and said first joint axis are substantially parallel to each other and perpendicular to said central axis.

10. A mechanism according to claim 1, wherein said end component is connected to said first joint body by a first and a second revolute joint in series allowing rotation about respective first and second revolute axes, and wherein said end component is connected to said second joint body by a third and a fourth revolute joint in series allowing rotation about respective third and fourth revolute axes.

11. A mechanism according to claim 10, wherein said first revolute axis is substantially coincident with said first joint axis, and wherein said second revolute axis is perpendicular to said first revolute axis and intersects said first revolute axis and said central axis, and wherein said fourth revolute axis is perpendicular to said third revolute axis and intersects said third revolute axis.

12. A mechanism according to claim 1, wherein said forearm and said actuator arm of at least one of said second, third, fourth, and fifth actuator limbs are connected by three revolute joints in series, said revolute joints having mutually non-parallel and intersecting axes of rotation.

13. A mechanism according to claim 1, wherein said forearm and said actuator arm of at least one of said second, third, fourth, and fifth actuator limbs are connected by a ball-and-socket joint.

14. A mechanism according to claim 1, further comprising a work tool movably mounted to said end component for actuatable movement relative thereto.

15. A mechanism according to claim 14, further comprising an actuator mounted to said base and operably linked to said work tool, said actuator driving said work tool to move relative to said end component.

16. A mechanism according to claim 14, further comprising an actuator mounted to said end component and operably linked to said work tool, said actuator driving said work tool to move relative to said end component.

17. A mechanism according to claim 1, wherein the forearm of each of said second and third actuator limbs is connected to the respective actuator arm wit three rotational degrees of freedom about a connection point, and wherein the connection points of said second and third actuator limbs substantially move in the same plane.

18. A mechanism according to claim 1, wherein said second limb member is connected to said first joint body by a revolute joint allowing rotation about said first joint axis, and wherein the forearms of said second and third actuator limbs are connected to said first joint body by respective revolute joints allowing rotation about said second and third joint axes, and wherein the forearms of said fourth and fifth actuator limbs are connected to said second joint body by respective revolute joints allowing rotation about said fourth and fifth joint axes.

19. A mechanism according to claim 1, further comprising influencing means, said influencing means urging said platform to be rotated about said central axis by at least one of the actuator arms of said second and third actuator limbs.

20. A mechanism according to claim 1, further comprising influencing means, said influencing means urging said platform to rotate about said central axis such that the actuator arms of said second and third actuator limbs remain at substantially equal angular distance from said first limb member.

21. A mechanism according to claim 20, wherein said influencing means comprise:

a guiding arm rotatably connected to said platform by a revolute joint allowing one rotational degree of freedom; and a first and a second influencing arm pivotably connected to the actuator arm of a respective one of said second and third actuator limbs by first influencing joints allowing at least two rotational degrees of freedom, each of said first and second influencing arms further being pivotably connected to said guiding arm by second influencing joints allowing at least two rotational degrees of freedom.

22. A mechanism according to claim 21, wherein at least one of said first and second influencing joints is a ball-and-socket joint.

23. A mechanism according to claim 21, wherein at least one of said first and second influencing joints is a universal joint.

24. A mechanism according to claim 20, wherein said influencing means comprise:

a first guiding arm rotatably connected to said platform by a revolute joint allowing one rotational degree of freedom;

a second guiding arm rotatably connected to said first guiding and by a revolute joint allowing one rotational degree of freedom; and a first and a second influencing arm connected to the actuator and of a respective one of said second and third actuator limbs by respective revolute joints allowing one rotational degree of freedom, each of said first and second influencing arms further being pivotably connected to said second guiding arm by universal joints allowing two degrees of freedom.

* * * * *